United States Patent
Nammi

(10) Patent No.: US 9,654,196 B2
(45) Date of Patent: May 16, 2017

(54) METHODS OF TRANSMITTING AND/OR RECEIVING DATA TRANSMISSIONS USING INFORMATION RELATING TO OTHER DATA TRANSMISSIONS AND RELATED NETWORK NODES

(71) Applicant: TELEFONAKTIEBOLAGET L M ERICSSON (PUBL), Stockholm (SE)

(72) Inventor: Sairamesh Nammi, Stockholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 254 days.

(21) Appl. No.: 14/116,312

(22) PCT Filed: Oct. 7, 2013

(86) PCT No.: PCT/SE2013/051173
§ 371 (c)(1),
(2) Date: Nov. 7, 2013

(87) PCT Pub. No.: WO2014/112914
PCT Pub. Date: Jul. 24, 2014

(65) Prior Publication Data
US 2014/0198776 A1  Jul. 17, 2014

Related U.S. Application Data

(60) Provisional application No. 61/753,565, filed on Jan. 17, 2013.

(51) Int. Cl.
*H04J 3/00* (2006.01)
*H04B 7/04* (2017.01)
(Continued)

(52) U.S. Cl.
CPC ............ *H04B 7/0486* (2013.01); *H04L 1/00* (2013.01); *H04L 1/0025* (2013.01);
(Continued)

(58) Field of Classification Search
CPC . H04B 1/7103; H04J 11/0023; H04J 11/0026; H04L 25/03006
(Continued)

(56) References Cited

U.S. PATENT DOCUMENTS 6,122,309 A   9/2000 Bergstrom et al.
6,901,243 B2  5/2005 Jayaraman et al.
(Continued)

FOREIGN PATENT DOCUMENTS

EP   1 318 613 A2   6/2003
WO   WO 2007/021906 A2   2/2007
(Continued)

OTHER PUBLICATIONS

International Search Report and Written Opinion for PCT/SE2013/051173; Date of Mailing; Mar. 27, 2014, 8 pages.
(Continued)

*Primary Examiner* — Marsha D. Banks Harold
*Assistant Examiner* — Elton Williams
(74) *Attorney, Agent, or Firm* — Sage Patent Group

(57) ABSTRACT

A method may be provided to receive communications at a first node operating in a wireless communication network from a second node. The method may include receiving first information from the second node operating in the wireless communication network, wherein the first information is for a first data transmission from the second node to the first node. Second information may be received from the second node, wherein the second information is for a second data transmission to a third node operating in the wireless communication network. The first data transmission may be received at the first node from the second node using the first information for the first data transmission received from the second node and using the second information for the second data transmission received from the second node.

(Continued)

Related transmission methods, network nodes, and wireless terminals are also discussed.

25 Claims, 15 Drawing Sheets

(51) Int. Cl.
*H04L 1/00* (2006.01)
*H04W 76/00* (2009.01)
*H04W 28/08* (2009.01)
*H04W 72/12* (2009.01)

(52) U.S. Cl.
CPC ........... *H04W 76/00* (2013.01); *H04L 1/0003* (2013.01); *H04L 1/0009* (2013.01); *H04W 28/08* (2013.01); *H04W 72/1289* (2013.01)

(58) Field of Classification Search
USPC .................................................. 455/63.1, 501
See application file for complete search history.

(56) References Cited

U.S. PATENT DOCUMENTS

| | | |
|---|---|---|
| 7,697,645 B2 | 4/2010 | Jong |
| 7,724,816 B2 | 5/2010 | Chen et al. |
| 7,881,711 B2 | 2/2011 | Lundby |
| 2003/0202568 A1 | 10/2003 | Choi et al. |
| 2004/0171364 A1 | 9/2004 | Pukkila |
| 2006/0120436 A1 | 6/2006 | Komatsu |
| 2007/0058709 A1 | 3/2007 | Chen et al. |
| 2007/0183544 A1 | 8/2007 | Lee et al. |
| 2010/0009705 A1* | 1/2010 | Budianu et al. ............. 455/501 |
| 2010/0056170 A1* | 3/2010 | Lindoff et al. ............. 455/452.1 |
| 2010/0284443 A1 | 11/2010 | Rosenqvist et al. |
| 2010/0309861 A1* | 12/2010 | Gorokhov et al. ........... 370/329 |
| 2011/0026167 A1 | 2/2011 | Duan et al. |
| 2011/0206167 A1 | 8/2011 | Rosenqvist et al. |
| 2012/0189083 A1 | 7/2012 | Reial |
| 2012/0281683 A1* | 11/2012 | Falconetti et al. ............ 370/336 |
| 2013/0005269 A1* | 1/2013 | Lindoff et al. ............... 455/63.1 |

FOREIGN PATENT DOCUMENTS

| | | |
|---|---|---|
| WO | WO 2010/005640 A2 | 1/2010 |
| WO | WO 2010/141911 A2 | 12/2010 |
| WO | WO 2011/063854 A1 | 6/2011 |

OTHER PUBLICATIONS

Huawei, Hisilicon: "Proposed SID: Study on UMTS Heterogeneous Networks", TSG RAN Meeting #57, Chicago, USA, Sep. 4-7, 2012; RP-121436, 3GPP, 5 pages.

Ericsson, ST-Ericsson: "Initial considerations on Heterogeneous Networks for UMTS", 3GPP TSG RAN WG1 Meeting #70bis San Diego, CA, USA, Oct. 8-12, 2012, R1124512, 7 pages.

Ericsson, ST-Ericsson: "Heterogeneous Network Deployment Scenarios", 3GPP TSG- RAN WG1 #70bis San Diego, CA, USA, Oct. 8-12, 2012, R1-124513, 3 pages.

Pouttu, A. et al., "Effects of Rayleigh Fading to Method-Selection in Interference Suppression", *IEEE Military Communications Conference*, 2005. vol. 2, pp. 1225-1230, Oct. 17-20, 2005.

Pouttu, A. et al., "Synchronization of FH/DS Signal with Interference Suppression Diversity", *2006 IEEE Ninth International Symposium on Spread Spectrum Techniques and Applications*, Aug. 28-31, 2006, pp. 69-73.

Zhao et al. "Hybrid Hard/Soft Interference Cancellation Based on List Viterbi Decoding" *IEEE Conference Record of the Thirty-Ninth Asilomar Conference on Signals, Systems and Computers*, pp. 839-842, 2005.

Agarwal et al. "A Reduced Complexity hybrid switched mode detector using interference cancellation methods for DS-CDMA systems" *IEEE Annual India Conference*, pp. 1-4, 2006.

Huawei, HiSilicon: "Proposed SID: Study on UMTS Heterogeneous Networks" RP-121436; TSG RAN Meeting #57, Chicago, USA, Sep. 4-7, 2012; 5 pages.

Ericsson, ST-Ericsson: "Initial considerations on Heterogeneous Networks for UMTS" R1-124512; 3GPP TSG RAN WG1 Meeting #70bis; San Diego, CA, USA, Oct. 8-12, 2012; 7 pages.

Ericsson, ST-Ericsson: "Heterogeneous Network Deployment Scenarios" R1-124513; 3GPP TSG-RAN WG1 #70bis; San Diego, CA, USA, Oct. 8-12, 2012; 3 pages.

Written Opinion of the International Preliminary Examining Authority, International Application No. PCT/SE2013/051173, mailed Jan. 23, 2015.

* cited by examiner

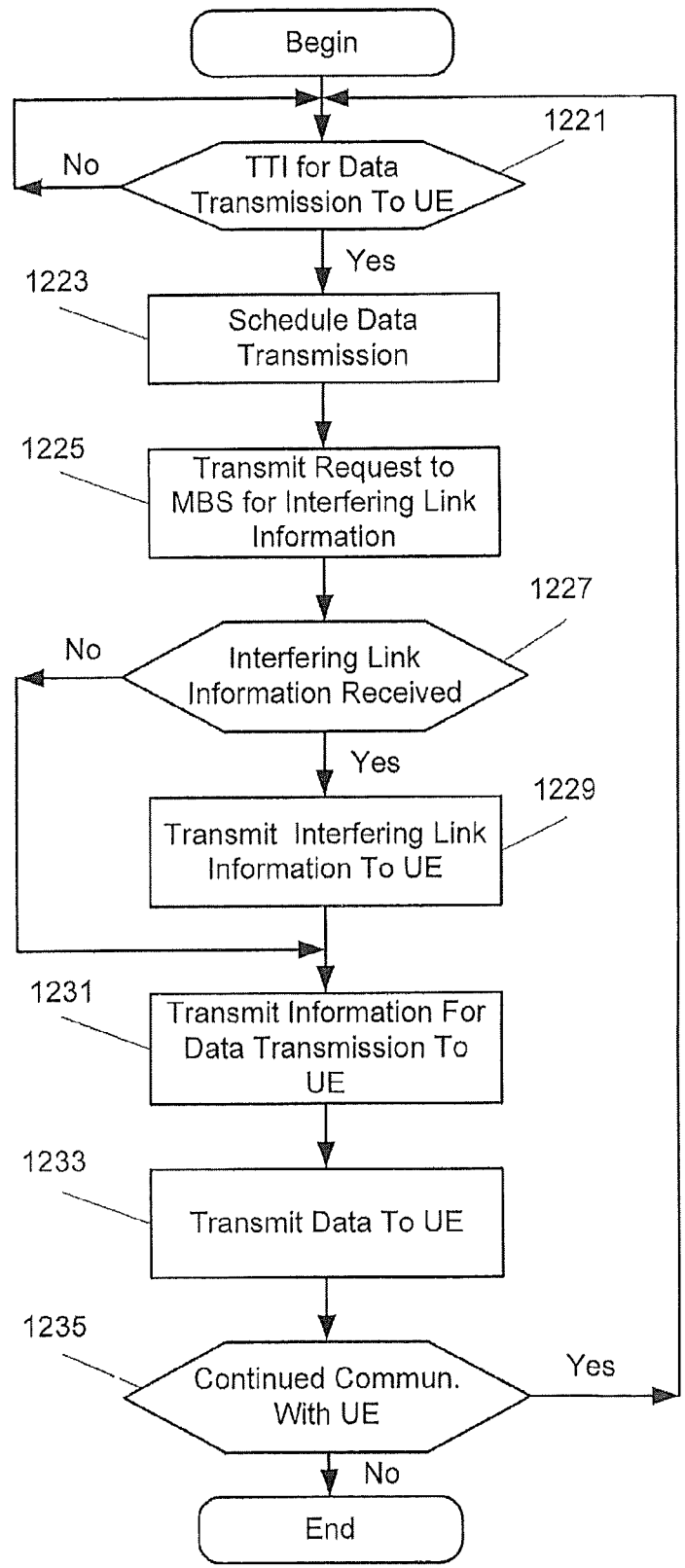

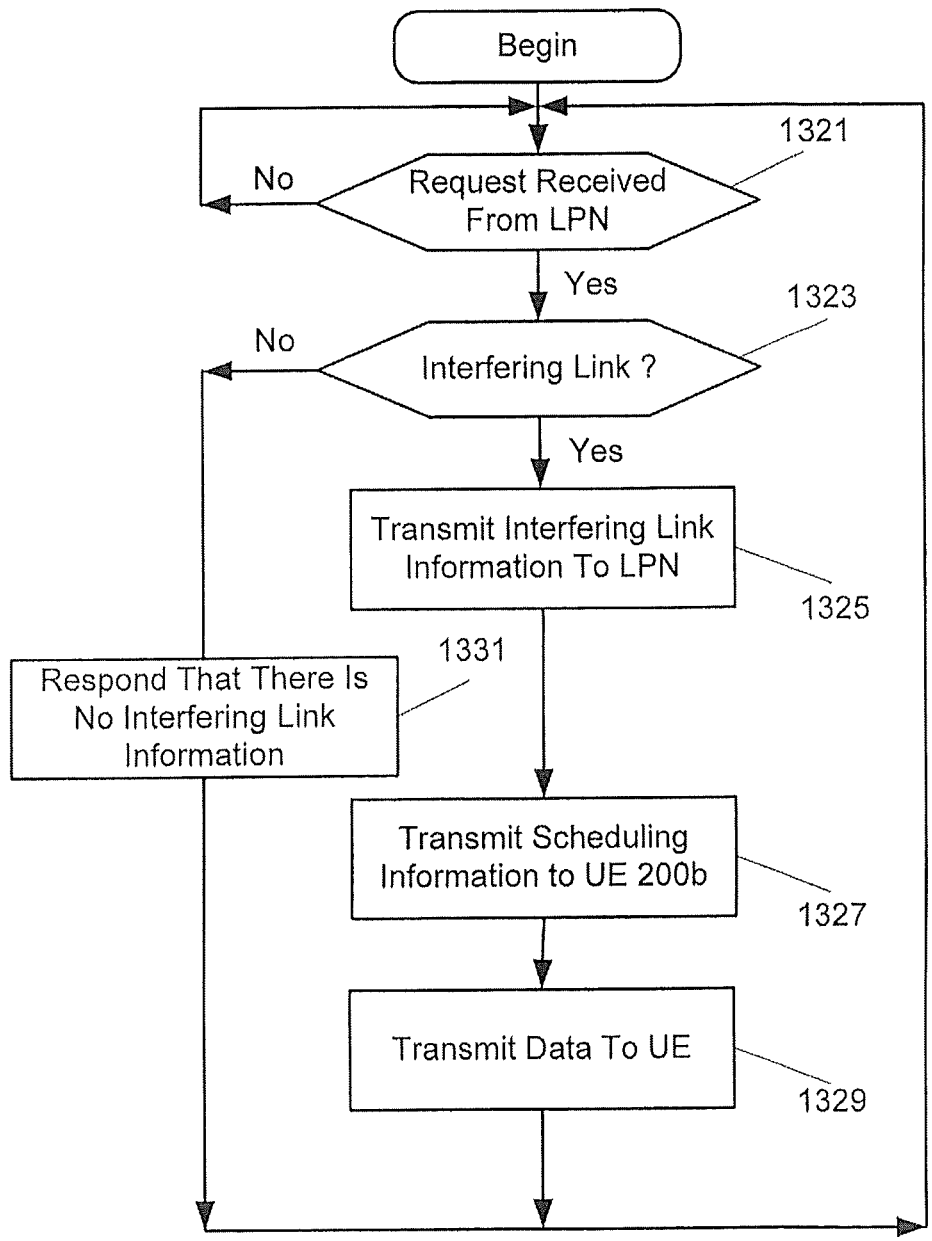

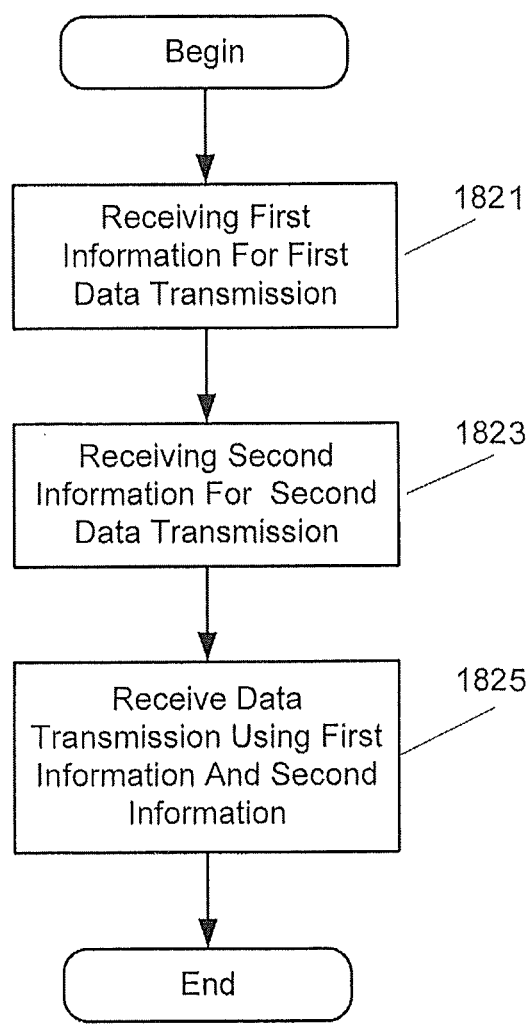

METHODS OF TRANSMITTING AND/OR RECEIVING DATA TRANSMISSIONS USING INFORMATION RELATING TO OTHER DATA TRANSMISSIONS AND RELATED NETWORK NODES

CROSS REFERENCE TO RELATED APPLICATION

This application is a 35 U.S.C. §371 national stage application of PCT International Application No. PCT/SE2013/051173, filed in the English language on 7 Oct. 2013, which itself claims the benefit of U.S. provisional Patent Application No. 61/753,565, filed 17 Jan. 2013, the disclosures and contents of both of which are incorporated by reference herein in their entirety.

TECHNICAL FIELD

The present disclosure is directed to communications and, more particularly, to wireless communication methods, networks, and network nodes.

BACKGROUND

In a typical cellular radio system, wireless terminals (also referred to as user equipment unit nodes, UEs, mobile terminals, and/or mobile stations) communicate via a radio access network (RAN) with one or more core networks. The RAN covers a geographical area which is divided into cell areas, with each cell area being served by a radio base station (also referred to as a base station, a RAN node, a "NodeB", and/or enhanced NodeB "eNodeB"). A cell area is a geographical area where radio coverage is provided by the base station equipment at a base station site. The base stations communicate through radio communication channels with wireless terminals within range of the base stations.

Cellular communications system operators have begun offering mobile broadband based on WCDMA (Wideband Code Division Multiple Access) and/or HSPA (High Speed Packet Access). Moreover, fuelled by introduction of new devices designed for data applications, end user performance requirements are steadily increasing. The increased adoption of mobile broadband has resulted in significant growth in traffic handled by HSPA networks. Accordingly, techniques that allow cellular operators to manage networks more efficiently may be desired.

Techniques to improve downlink performance may include 4-branch MIMO (Multiple Input Multiple Output), multiflow communication, multi carrier deployment, etc. Since spectral efficiencies per link may be approaching theoretical limits, next steps may include improving spectral efficiencies per unit area. Further efficiencies for HSDPA may be achieved, for example, by changing a topology of traditional networks to provide increased uniformity of user experiences throughout a cell. Currently, heterogeneous networks are being developed for 3GPP as discussed, for example, in: RP-121436, Study on UMTS Heterogeneous Networks, TSG RAN Meeting #57, Chicago, USA, 4-7 Sep. 2012; R1-124512, Initial considerations on Heterogeneous Networks for UMTS, Ericsson, ST-Ericsson, 3GOO TSG RAN WG1 Meeting #70bis, San Diego, Calif., USA, 8-12 Oct. 2012; and R1-124513, Heterogeneous Network Deployment Scenarios, Ericsson, ST-Ericsson, 3GPP TSG-RAN WG1 #70bis, San Diego, Calif., USA, 8-12 Oct. 2012.

A homogeneous network is a network of base stations (also referred to as NodeB's) in a planned layout providing communications services for a collection of user terminals (also referred to as user equipment nodes, UEs, and/or wireless terminals) in which all base stations may have similar transmit power levels, antenna patterns, receiver noise floors, and/or backhaul connectivity to the data network. Moreover, all base stations in a homogeneous network may offer unrestricted access to user terminals in the network, and each base station may serve roughly a same number of user terminals. Current cellular wireless communications systems in this category may include, for example, GSM (Global System for Mobile communication), WCDMA, HSDPA (High Speed Downlink Packet Access), LTE (Long Term Evolution), Wimax (Worldwide Interoperability for Microwave Access), etc.

In a heterogeneous network, low power node base stations (also referred to as low power nodes, LPNs, micro nodes, pico nodes, femto nodes, relay nodes, remote radio unit nodes, RRU nodes, small cells, RRUs, etc.) may be deployed as shown in FIG. 1 together with planned and/or regularly placed macro base stations, including macro base station MBS. Macro base station MBS may thus provide service over a relatively large macro cell area Mca, and each LPN may provide service for a respective relatively small LPN cell area Lca within the relatively large macro cell area Mca. Power transmitted by an LPN (e.g., 2 Watts) may be relatively small compared to power transmitted by a macro base station (e.g., 40 Watts for a typical macro base station). An LPN may be deployed, for example, to reduce/eliminate a coverage hole(s) in macro cell area Mca of macro base station MBS and/or to off-load traffic from macro base station MBS (e.g., to increase capacity in a high traffic location, also referred to as a hot-spot). Due to the lower transmit power and smaller physical size, an LPN may offer greater flexibility for site acquisition(s).

LPNs deployed in a heterogeneous network may have a property that each LPN has its own cell identity (e.g., a unique scrambling code). More particularly, LPNs within macro cell area Mca and macro base station MBS servicing the macro cell area Mca may operate as different cells, but the LPNs and MBS within macro cell area Mca may share the same frequency, and this arrangement may be referred to as co-channel deployment with each LPN and MBS having a unique cell identity (e.g., a unique scrambling code).

FIG. 2 illustrates a heterogeneous network with co-channel deployment, where the low power node cell areas Lca-1 and Lca-2 (also referred to as low power cells) may be serviced by respective low power nodes LPN-1 and LPN-2 as well as macro base station MBS providing service for the larger macro cell area MCA (also referred to as a macro cell). Note that each base station (i.e., each of MBS, LPN-1, and LPN-2) may provide service using a respective individual pilot signal (e.g., CPICH-MBS, CPICH-1, and CPICH-2), downlink control channels, uplink control channels, and data traffic channels. Stated in other words, each base station may act independently so that cell areas (Mca, Lca-1, and Lca-2) or cell may be characterized by respective pilot signals, downlink control channels, uplink control channels, and data traffic channels. Accordingly, each base station may provide service using a different common pilot channel (CPICH).

FIG. 3 is a graph illustrating simulated gains achieved in average sector throughput with different values of LPN power. Note that a maximum gain may be achieved when the cells are fully loaded, and the gains may be primarily achieved due to load balancing.

Even though gains in average sector throughput may be provided by deploying low power nodes LPNs, throughput of individual UEs communicating with low power nodes LPNs may be impacted due to interference from macro base station MBS transmissions. Such MBS interference may be most significant when a UE is connected with a low power node LPN and the dominant interferer is the macro base station MBS. The region of a LPN cell area Lca where this type of interference from a macro base station is most prevalent may be referred to as an LPN cell expansion region or Lcer. A cell expansion range Lcer area of low power node LPN is illustrated in FIG. 4 as an outer region of LPN cell area Lca. In this cell range expansion area Lcer, a UE may experience relatively strong interference from macro base station MBS transmissions. In some cases, a UE in the cell expansion range Lcer area may receive MBS transmissions at greater power than transmissions from LPN. By forcing connection to the LPN when a UE is in a cell range expansion area, however, overall network performance may be improved by unloading traffic from the macro base station MBS.

FIG. 5 is a graph illustrating simulated link throughput when a UE is connected to an LPN with relatively strong interference from a macro base station (e.g., when the UE is located in the LPN cell expansion region Lcer of FIG. 4). As shown in FIG. 5, UE performance may be significantly impacted when the dominant interferer power received at the UE is 10 to 20 times greater than that of low power node transmissions received at the UE. Stated in other words, performance of UE reception may be significantly impacted when the UE is located in an LPN cell expansion area where MBS transmissions received at the UE have a power that is at least 10 times greater than a power of LPN transmissions received at the UE.

SUMMARY

It may therefore be an object(s) of some embodiments disclosed herein to reduce interference, improve efficiency, and/or improve link performance in wireless communications networks.

According to some embodiments, a method of receiving communications at a first node (e.g., a first wireless terminal) from a second node (e.g., a low power node) operating in a wireless communication network may include receiving first information (e.g., scheduling information) from the second node operating in the wireless communication network. The first information is for a first data transmission from the second node to the first node. Second information (e.g., interfering link information) may be received from the second node. The second information is for a second data transmission to a third node (e.g., a second wireless terminal) operating in the wireless communication network. The first data transmission is received at the first node from the second node using the first information for the first data transmission received from the second node and using the second information for the second data transmission received from the second node.

By providing first information (e.g., scheduling information) for a data transmission to be received at a node (e.g., received at a wireless terminal from a low power node) and also providing second information (interfering link information) for another transmission to another node (e.g., from a macro base station to another wireless terminal) at the node, the node may be able to provide improved interference cancellation relative to the other transmission. Link performance/throughput for wireless terminals communicating with low power nodes in cell expansion regions may thus be improved. By reducing performance degradation due to macro base station interference, wireless terminals may be more aggressively offloaded from macro base stations to low power nodes, and gains due to load balancing may be increased. Stated in other words, cell expansion regions may be further expanded and/or performance of wireless terminals in cell expansion regions may be improved.

The first node may be a first wireless terminal, the second node may be a first base station, the third node may be a second wireless terminal, and the second data transmission may be a transmission from a second base station to the second wireless terminal. More particularly, the first base station may be a low power node (e.g., a low power node base station), and the second base station may be a macro base station.

The first data transmission from the second node may transmitted during a transmission time interval (TTI), the second data transmission to the third node may be transmitted during at least a portion of the TTI, and the first and second data transmissions may be transmitted using a same frequency. Moreover, the first and second data transmissions may be transmitted using different spreading codes.

The first information may include scheduling information for the first data transmission from the second node (e.g., the low power node base station) to the first node (e.g., the first wireless terminal). More particularly, the scheduling information for the first data transmission may include at least one of spreading code information for the first data transmission, modulation information for the first data transmission, and/or transport block size information for the first data transmission. Moreover, if the first data transmission is a MIMO (Multiple Input Multiple Output) transmission, the scheduling information may include MIMO precoding vector information for the first data transmission and/or MIMO rank information for the first data transmission.

The second information (e.g., interfering link information) may include scheduling information for the second data transmission to the third node. Accordingly, receiving the first data transmission may include: receiving the second data transmission using the scheduling information for the second data transmission received from the second node and a received radio signal, generating a reconstruction of the second data transmission responsive to receiving the second data transmission, and receiving the first data transmission using the received radio signal and the reconstruction of the second data transmission.

The second information (e.g., interfering link information) may include an identification of the third node. Accordingly, receiving the first data transmission may include: receiving scheduling information for the second data transmission to the third node using the identification of the third node, receiving the second data transmission using the scheduling information for the second data transmission and a received radio signal, generating a reconstruction of the second data transmission responsive to receiving the second data transmission, and receiving the first data transmission using the received radio signal and the reconstruction of the second data transmission.

The scheduling information for the second data transmission may include at least one of spreading code information for the second data transmission, modulation information for the second data transmission, and/or transport block size information for the second data transmission. If the second data transmission is a MIMO (Multiple Input Multiple Output) transmission, the scheduling information may also include at least one of MIMO precoding vector information for the second data transmission and/or MIMO rank information for the second data transmission.

Receiving the second data transmission may include generating symbols of the second data transmission, and generating the reconstruction of the second data transmission may include generating the reconstruction of the second data transmission using symbols of the second data transmission. More particularly, generating the reconstruction may include generating the reconstruction of the second data transmission using symbols of the second data transmission without demodulating the symbols.

Receiving the second data transmission may include generating symbols of the second data transmission and generating data bits of the second data transmission by demodulating the symbols, and generating the reconstruction of the second data transmission may include generating the reconstruction of the second data transmission using the data bits of the second data transmission.

Receiving second information from the second node may include receiving the second information from the second node over a control channel. More particularly, receiving the second information from the second node may include receiving the second information over the control channel using a high speed shared control channel (HS-SCCH) order.

According to other embodiments, a method of transmitting communication from a first node (e.g., a low power node) operating in a wireless network to a second node (e.g. a first wireless terminal) may include transmitting first information (e.g., scheduling information) from the first node to the second node operating in the wireless network. The first information is for a first data transmission from the first node to the second node. Second information (e.g., interfering link information) is transmitted from the first node to the second node. The second information is for a second data transmission to a third node (e.g., a second wireless terminal) operating in the wireless communication network. The first data transmission is transmitted from the first node to the second node in accordance with the first information for the first data transmission.

The first node may be a first base station (e.g., a low power node base station), the second node may be a first wireless terminal, the third node may be a second wireless terminal, and the second data transmission may be from a second base station (e.g., a macro base station) to the second wireless terminal.

Before transmitting the second information, the second information may be received at the first base station from the second base station.

The first data transmission from the second node may be transmitted during a transmission time interval (TTI), the second data transmission to the third node may be transmitted during at least a portion of the TTI, and the first and second data transmissions may be transmitted using a same frequency. Moreover, the first and second data transmissions may be transmitted using different spreading codes.

The first information may include scheduling information for the first data transmission from the second node to the first node. This scheduling information for the first data transmission may include at least one of spreading code information for the first data transmission, modulation information for the first data transmission, and/or transport block size information for the first data transmission. Moreover, if the first data transmission is a MIMO (Multiple Input Multiple Output) transmission, the scheduling information may include at least one of MIMO precoding vector information for the first data transmission and/or MIMO rank information for the first data transmission. Transmitting the first data transmission may include transmitting the first data transmission in accordance with the scheduling information for the first data transmission.

The second information (e.g., interfering link information) may include scheduling information for the second data transmission to the third node. This scheduling information for the second data transmission may include at least one of spreading code information for the second data transmission, modulation information for the second data transmission, and/or transport block size information for the second data transmission. If the second data transmission is a MIMO (Multiple Input Multiple Output) transmission, the scheduling information may also include MIMO precoding vector information for the second data transmission and/or MIMO rank information for the second data transmission.

The second information (e.g., interfering link information) may include an identification of the third node.

Transmitting the second information (e.g., interfering link information) may include transmitting the second information over a control channel (e.g., an HS-SCCH). More particularly, transmitting the second information may include transmitting the second information over the control channel using a high speed shared control channel HS-SCCH order.

According to some other embodiments, a method of operating a first base station (e.g., a macro base station) communicating with a wireless terminal in a wireless network may include transmitting scheduling information from the first base station to the wireless terminal. The scheduling information is for a data transmission to the wireless terminal. Interfering link information is transmitted from the first base station to a second base station (e.g., a low power node base station). The interfering link information relates to the data transmission to the wireless terminal. The data transmission is transmitted from the base station to the wireless terminal in accordance with the scheduling information for the data transmission.

The first base station may be a macro base station, and the second base station may be a low power node base station. The data transmission may be transmitted during a transmission time interval (TTI), a second data transmission may be transmitted by the second base station to a second wireless terminal during at least a portion of the TTI, and the first and second data transmissions may be transmitted using a same frequency and using different spreading codes.

The scheduling information for the data transmission may include at least one of spreading code information for the data transmission, modulation information for the data transmission, and/or transport block size information for the data transmission. If the data transmission is a MIMO (Multiple Input Multiple Output) transmission, the scheduling information may also include at least one of MIMO precoding vector information for the data transmission and/or MIMO rank information for the data transmission.

The interfering link information may include the scheduling information for the data transmission, and/or the interfering link information may include an identification of the wireless terminal.

According to still other embodiments, a first node (e.g., a wireless terminal) may be configured to operate in a wireless communication network, and the first node may include a transceiver configured to transmit/receive communications to/from a second node (e.g., a low power node) of the wireless communication network, and a processor coupled to the transceiver. The processor may be configured to receive first information through the transceiver from the second node, and the first information may be for a first data transmission from the second node to the first node. The processor may also be configured to receive second information through the transceiver from the second node, and the second information may be for a second data transmission to a third node communicating with the wireless communication network. In addition, the processor may be configured to receive the first data transmission through the transceiver from the second node using the first information for the first data transmission received from the second node and using the second information for the second data transmission received from the second node.

According to yet other embodiments, a first node (e.g., a low power node) may be configured to operate in a wireless communication network, and the first node may include a transceiver configured to transmit/receive communications to/from a second node (e.g., a wireless terminal), and a processor coupled to the transceiver. The processor may be configured to transmit first information through the transceiver to the second node, and the first information may be for a first data transmission from the first node to the second node. The processor may also be configured to transmit second information through the transceiver to the second node, and the second information may be for a second data transmission to a third node (e.g., another wireless terminal) communicating with the wireless communication network. In addition, the processor may be configured to transmit the first data transmission through the transceiver to the second node in accordance with the first information for the first data transmission.

According to still more embodiments, a first base station may operate in a wireless communication network, and the first base station may include a transceiver configured to transmit/receive communications to/from a first wireless terminal, and a processor coupled to the transceiver. The processor may be configured to transmit scheduling information through the transceiver to the wireless terminal, and the scheduling information may be for a data transmission to the wireless terminal. The processor may also be configured to transmit interfering link information to a second base station, and the interfering link information may relate to the data transmission to the wireless terminal. In addition, the processor may be configured to transmit the data transmission from the first base station to the wireless terminal in accordance with the scheduling information for the data transmission.

BRIEF DESCRIPTION OF THE DRAWINGS

The accompanying drawings, which are included to provide a further understanding of the disclosure and are incorporated in and constitute a part of this application, illustrate certain non-limiting embodiment(s) of inventive concepts. In the drawings:

FIG. 12 is a flow chart illustrating operations of an LPN base station of FIGS. 6, 11A, and 11D according to some embodiments;

FIG. 13 is a flow chart illustrating operations of a macro base station of FIGS. 6, 11A, and 11C according to some embodiments;

FIG. 18 is a flow chart illustrating operations of receiving communications at a first node from a second node operating in wireless communication network according to some embodiments.

DETAILED DESCRIPTION

Figure 1:
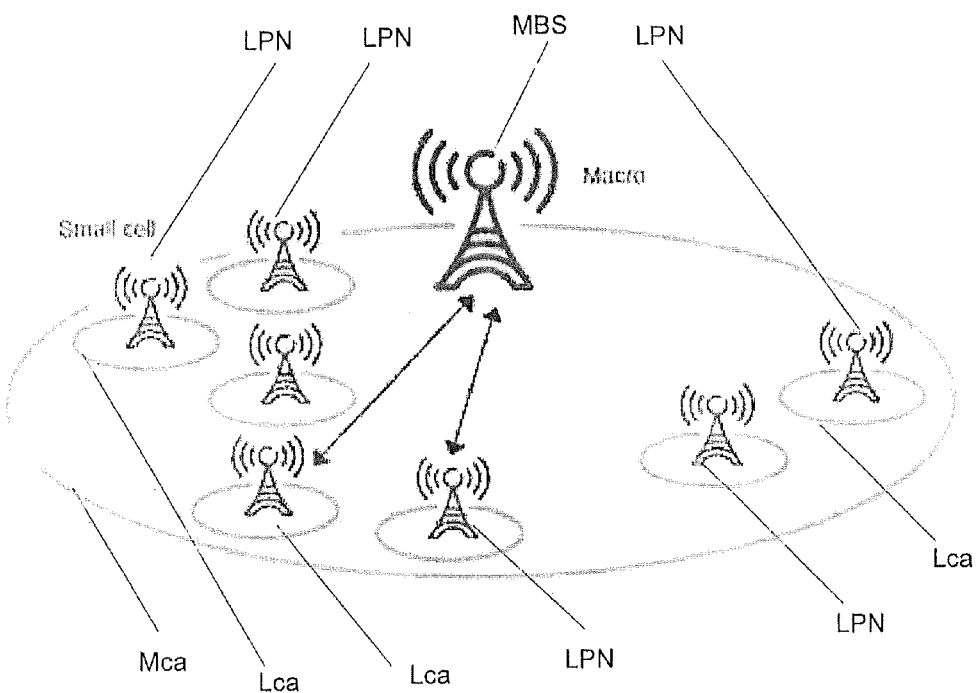
FIG. 1 is a schematic diagram of low power nodes deployed in a macro cell area of a macro base station.
Figure 2:
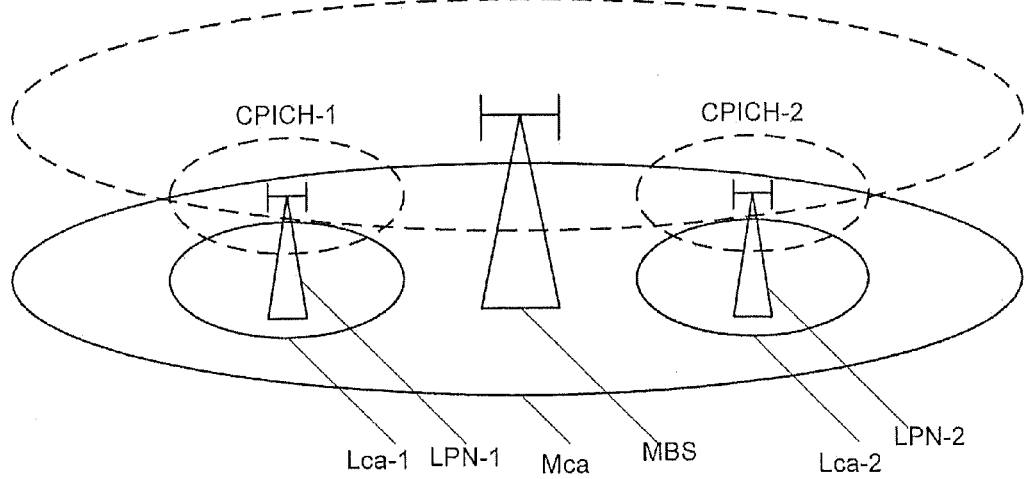
FIG. 2 is a schematic diagram illustrating a deployment of low power nodes in a co-channel heterogeneous network.
Figure 3:
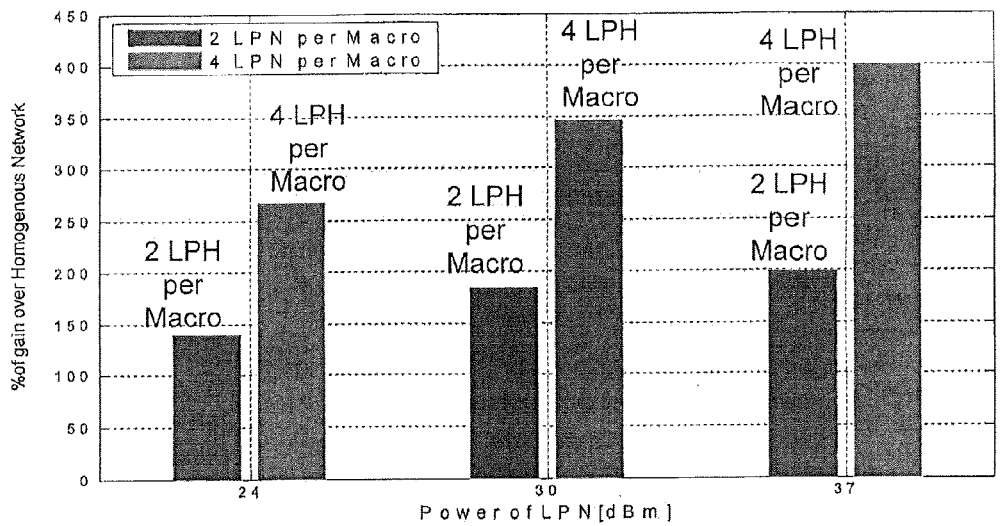
FIG. 3 is a graph illustrating gains achievable due to low power node deployment in co-channel heterogeneous networks.
Figure 4:
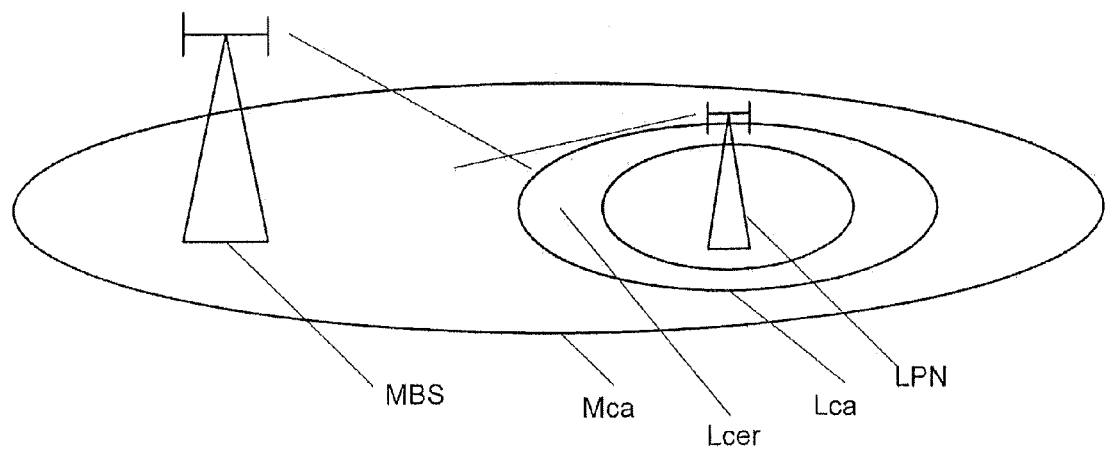
FIG. 4 is a schematic diagram illustrating a cell range expansion area of a low power node in a heterogeneous network.
Figure 5:
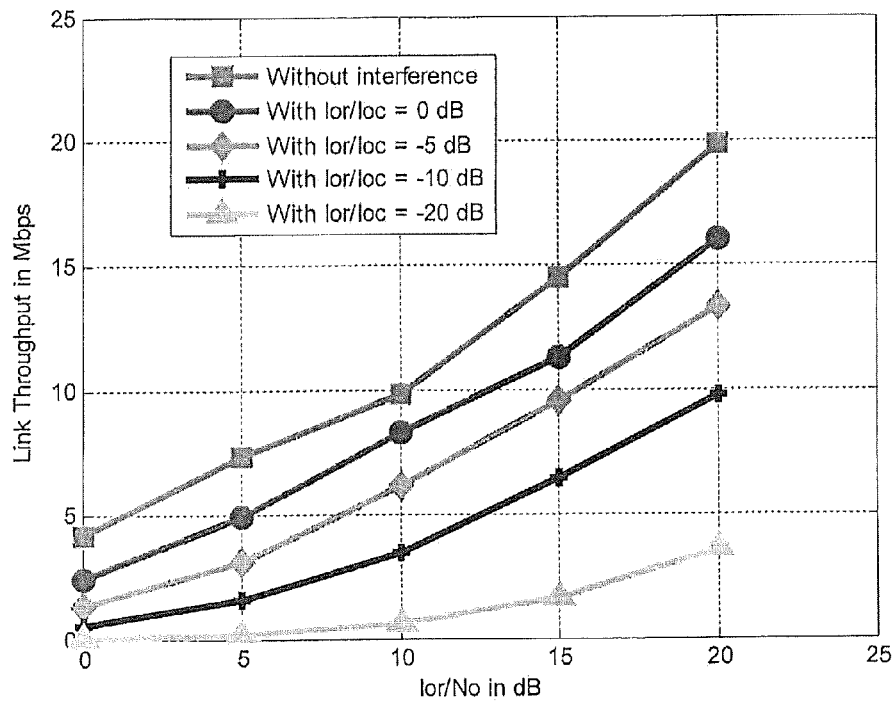
FIG. 5 is a graph illustrating simulated link level throughput in a cell range expansion area where the UE performance is impacted due to dominant macro base station interference.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

For purposes of illustration and explanation only, these and other embodiments of present inventive concepts are described herein in the context of operating in a Radio Access Network (RAN) that communicates over radio communication channels with wireless terminals (also referred to as UEs). It will be understood, however, that present inventive concepts are not limited to such embodiments and may be embodied generally in any type of communication network. As used herein, a wireless terminal or UE can include any device that receives data from a communication network, and may include, but is not limited to, a mobile telephone ("cellular" telephone), laptop/portable computer, pocket computer, hand-held computer, desktop computer, a machine to machine (M2M) or MTC type device, a sensor with a wireless communication interface, etc.

In some embodiments of a RAN, several base stations may be connected (e.g., by landlines or radio channels) to a radio network controller (RNC). A radio network controller, also sometimes termed a base station controller (BSC), may supervise and coordinate various activities of the plural base stations connected thereto. A radio network controller may be connected to one or more core networks. According to some other embodiments, a RAN base station may be connected to one or more core networks without a separate RNC(s) therebetween, for example, with functionality of an RNC implemented at base stations and/or core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) includes the Long Term Evolution (LTE) and System Architecture Evolution (SAE).

Note that although terminology from WCDMA and/or HSPA is used in this disclosure to exemplify embodiments of the inventive concepts, this should not be seen as limiting the scope of inventive concepts to only these systems. Other wireless systems, including 3GPP ($3^{rd}$ Generation Partnership Project) LTE (Long Term Evolution), WiMax (Worldwide Interoperability for Microwave Access), UMB (Ultra Mobile Broadband), HSDPA (High-Speed Downlink Packet Access), GSM (Global System for Mobile Communications), etc., may also benefit from exploiting embodiments of present inventive concepts disclosed herein.

Also note that terminology such as base station (also referred to as NodeB, eNodeB, or Evolved Node B) and wireless terminal (also referred to as User Equipment node or UE) should be considering non-limiting and does not imply a certain hierarchical relation between the two. In general a base station (e.g., a "NodeB" or "eNodeB") and a wireless terminal (e.g., a "UE") may be considered as examples of respective different communications devices that communicate with each other over a wireless radio channel. While embodiments discussed herein may focus on wireless transmissions in a downlink from a NodeB to a UE, embodiments of inventive concepts may also be applied, for example, in an uplink. Furthermore, although the description below focuses, for purposes of illustration, on example embodiments in which described solutions are applied in heterogeneous networks that include a mix of relatively higher-power (e.g., "macro") base stations and relatively lower-power node (e.g., "pico") base stations, the described techniques may be applied in any suitable type of network, including both homogeneous and heterogeneous configurations. Thus, the base stations involved in the described configurations may be similar/identical to one another, or may differ in terms of transmission power, number of transmitter-receiver antennas, processing power, receiver and transmitter characteristics, and/or any other functional or physical capability.

Figure 6:
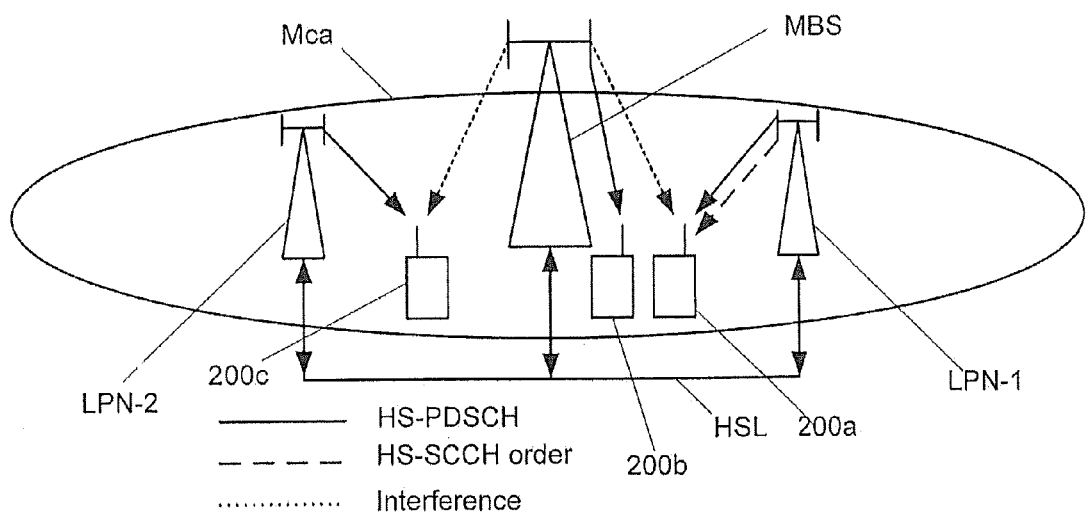
FIG. 6 is a schematic diagram illustrating a network configuration conveying information for an interfering signal according to some embodiments.

FIG. 6 is a block diagram illustrating a network configuration according to some embodiments disclosed herein. As shown, the macro base station MBS and the LPNs may be connected via a high speed link HSL (e.g., an X2 interface) where messages may be exchanged between these nodes on a per TTI (transmission time interval) level. Stated in other words, the high speed link HSL may support communication of scheduling information and/or UE IDs between macro base station MBS and each low power node LPN-1 and LPN-2 for each transmission time interval. Accordingly, when a UE 200*a* in cell expansion region Leer of LNP base station LPN-1 is connected to low power node LPN-1 and a downlink communication is scheduled for transmission from low power node LPN to UE 200*a*, the LPN may also get information (e.g., a UE ID and/or scheduling information) via high speed link HSL about an interfering transmission from macro base station MBS to another UE 200B. For example, macro base station MBS may provide scheduling information for the interfering transmission (e.g., information identifying a spreading code, a modulation order, a transport block size, etc.) and/or a UE ID (identification) of the intended recipient (e.g., UE 200*b*) of the interfering transmission over the high speed link HSL to LPN-1. Low power node LPN-1 can then transmit this scheduling information and/or UE ID to UE 200*a* over a control channel, for example, as an HS-SCCH order over a High-Speed Shared Control Channel HS-SCCH.

As shown in FIG. 6, low power node LPN-1, macro base station MBS, and low power node LPN-2 may transmit data over respective downlink data channels (e.g., HS-PDSCH indicated by solid lines) to respective wireless terminals 200*a*, 200*b*, and 200*c* during a same TTI using a same frequency. While each of LPN-1, MBS, and LPN-2 may transmit using different spreading codes, the downlink data transmission from MBS may generate interference (indicated by dotted lines) with respect to reception by wireless terminals 200*a* and 200*c* receiving transmissions from low power nodes LPN-1 and LPN-2.

If the scheduling information for an interfering link (from macro base station MBS to UE 200*b*) is transmitted from low power node LPN-1 to the UE 200*a* as an HS-SCCH order (over HS-SCCH indicated by dashed lines), the HS-SCCH order may include indication bits identifying the HS-SCCH order as an order providing macro base station MBS scheduling information for an interfering transmission from macro base station MBS to UE 200*b*. The HS-SCCH order may also include modulation information, transport block size information, and/or spreading code information for the interfering transmission. In addition, the HS-SCCH information may include precoding vector/index and rank information if the interfering transmission is scheduled as a MIMO (multiple-input-multiple-output) transmission.

In an alternative or in addition, macro base station MBS may provide a UE ID identifying the UE (e.g., UE 200*b*) that is the intended recipient of the interfering transmission, and the HS-SCCH order may include the UE ID (identification) from macro base station MBS. In this case, low power node LPN-1 may transmit the HS-SCCH order including the UE ID of the intended recipient (e.g., UE 200*b*) to the UE 200*a* in the cell expansion region of low power node LPN-1 so that the desired UE 200*a* in the cell expansion region can decode a control channel (e.g., HS-SCCH) for the interfering transmission from macro base station MBS (to UE 200*b*) and can get the scheduling information for the interfering downlink communication from macro base station MBS (e.g., over the control channel HS-SCCH transmitted by MBS).

Once UE 200*a* gets the scheduling information for the interfering transmission from macro base station MBS, UE 200*a* can cancel/reduce the interference using interference cancellation as discussed below.

Figure 7:
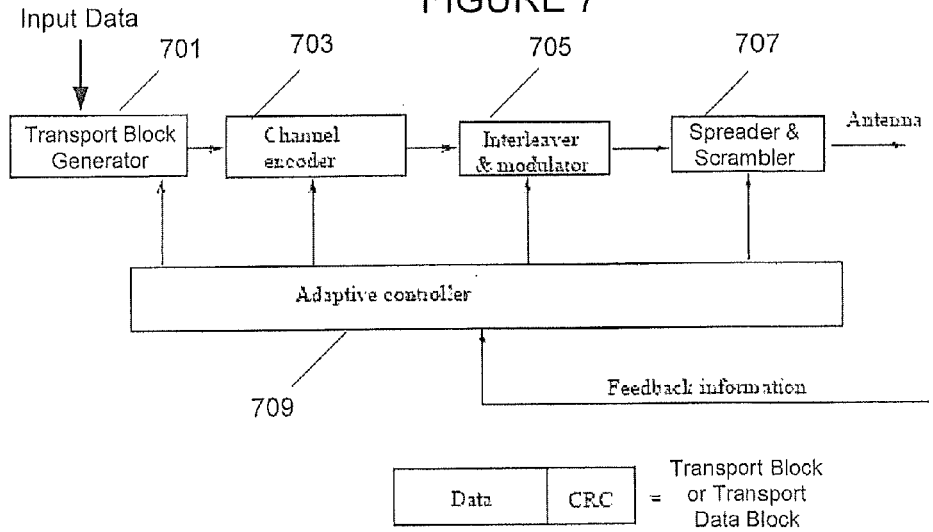
FIG. 7 is a block diagram illustrating transmission elements according to some embodiments.

FIG. 7 is a block diagram illustrating elements/functionalities of a downlink transmitter/processor of low power node LPN-1 according to some embodiments disclosed herein.

Input data from higher layers is received at transport block generator 701 and appended with a cyclic redundancy code CRC to generate transport data blocks TBs (with each TB including input data and a CRC) that are passed to channel encoder 703. A code rate to be applied by channel encoder 703 may be decided by adaptive controller 709 based on feedback information received from the UE. Channel encoder thus generates channel encoded bits for each transport data block that are passed to/through interleaver and modulator 705. Parameters of interleaver and modulator 705 may be controlled by adaptive controller 709 based on feedback information received from the UE. Interleaver and modulator 705 thus generates symbols for encoded transport data blocks. Spreader and scrambler 707 spreads and scrambles the resulting symbols, and the spread and scrambled symbols are passed from spreader and scrambler 707 to the antenna(s) for transmission. In general, adaptive controller 709 may control operations of transport block generator 701 (e.g., transport block size), channel encoder 703 (e.g., code rate), interleaver and modulator 705 (e.g., modulation order/scheme), and spreader and scrambler 707 (e.g., spreading/scrambling codes) responsive to feedback from the UE to which the downlink data is being transmitted.

Figure 8:
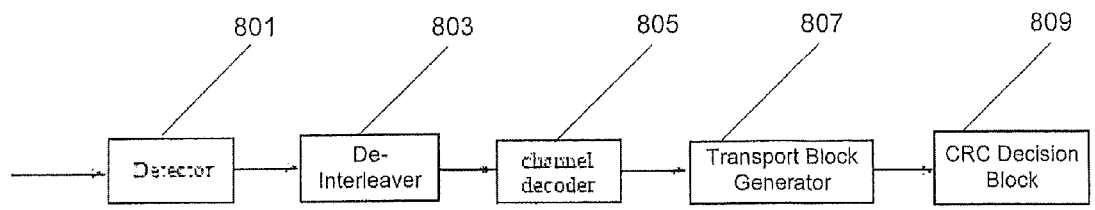
FIGS. 8 and 9 are block diagrams illustrating receiver elements according to some embodiments.

FIG. 8 is a block diagram illustrating elements/functionalities of a downlink receiver/processor of a UE. Symbols from the UE antenna are passed to detector 801 which despreads and descrambles the received symbols to generate received bits. Detector 801, for example, may be an MMSE (minimum mean-square error) detector, a GRAKE (generalized RAKE) detector, etc., but other receiver structures may be used according to embodiments disclosed herein. In some receivers, a detector may assume that interference from macro base station MBS (also referred to as macro cell interference) is white noise (e.g., a Type 3 receiver), while in some receivers, a detector may use channel estimates from a macro node to compute a weight matrix of MMSE, GRAKE, etc. (e.g., a Type 3i receiver). After detection, the received bits may be de-interlaved by de-interleaver 803, decoded by channel decoder 805, and grouped by transport block generator 807. Each resulting transport data block (including data bits and a CRC) is checked by CRC decision block 809 using the CRC for error detection. If the CRC check fails for a transport data block, a negative-acknowledgment or NAK is transmitted as feedback to low power node LPN for retransmission of the failed transport data block. If the CRC check passes for a transport data block, an acknowledgment or ACK is transmitted as feedback to low power node LPN, and the successfully received data is passed to upper levels of the UE receiver/processor.

Figure 9:
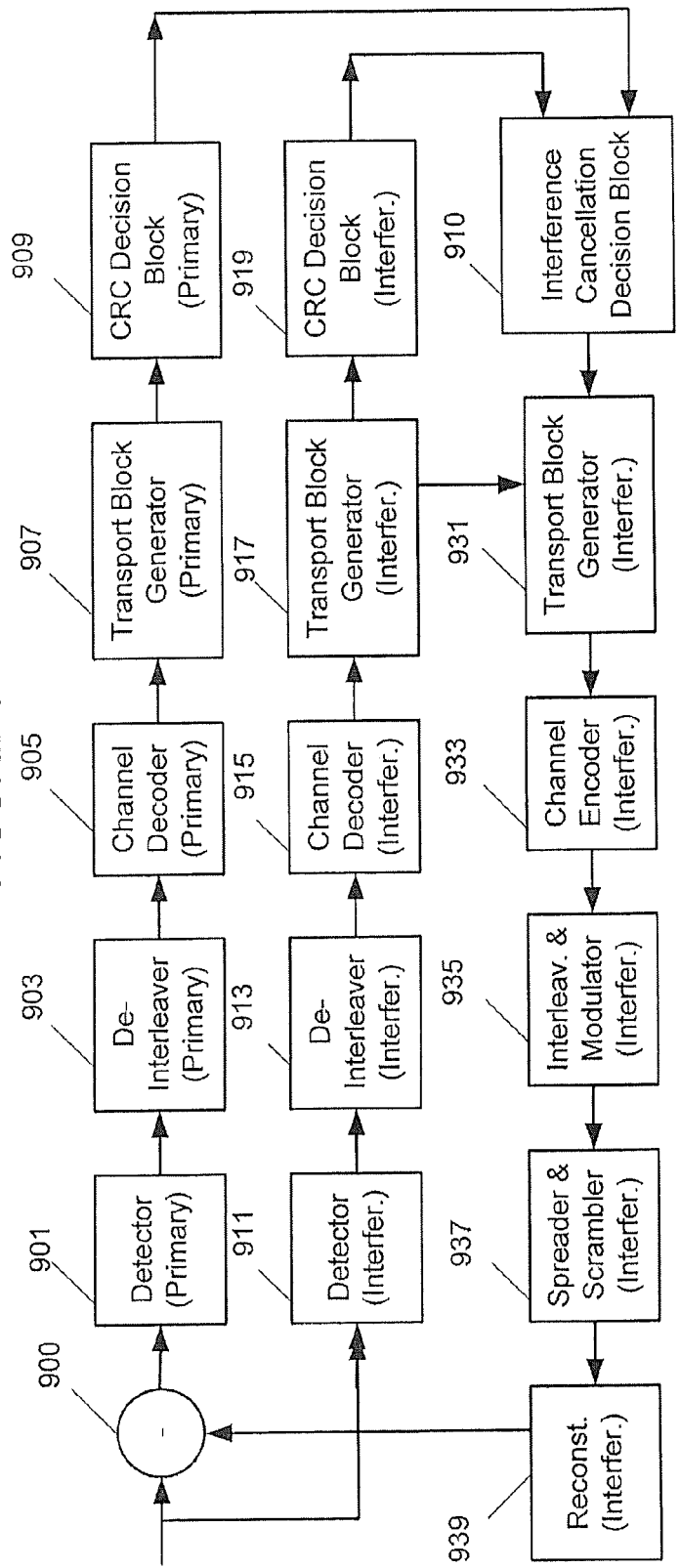

FIG. 9 is a block diagram illustrating elements/functionalities of a UE downlink receiver/processor configured to provide interference cancellation according to some embodiments disclosed herein. A first pass of reception may be performed using primary signal detector 901, primary signal de-interleaver 903, primary signal channel decoder 905, primary signal transport block generator 907, and primary signal CRC decision block 909 as discussed above with respect to FIG. 8. If the downlink data from low power node LPN is successfully received at the UE as indicated by successful CRC check at CRC decision block 909, interference cancellation decision block 910 may allow transport block generator 907 to pass the successfully received data to a higher layer of downlink receiver/processor and an ACK may be transmitted to the base station to indicated successful reception. Accordingly, unnecessary processing overhead for interference cancellation may be avoided if the downlink transmission from low power node LPN is successfully received in the first pass without interference cancellation.

If the downlink data from low power node LPN is not successfully received at the UE in the first pass as indicated by a failed CRC check at CRC decision block 909, interference cancellation decision block 910 may initiate decoding of the interfering transmission from macro base station using interference signal detector 911, interference signal de-interleaver 913, interference signal channel decoder 915, interference signal transport block generator 917, and interference signal CRC decision block 919. As discussed above, low power node LPN may either: (1) transmit scheduling information (e.g., including spreading code information, modulation information, transport block size information, MIMO (Multiple Input Multiple Output) precoding vector information, MIMO rank information, etc.) for the interfering MBS downlink transmission; or (2) transmit a UE identification ID for the intended recipient of the interfering MCS downlink transmission allowing the UE to receive scheduling information for the interfering MBS downlink transmission directly from the MBS. Since scheduling information for the interfering transmission from the MBS is known at the UE served by low power node LPN, the UE served by the LPN can decode this interfering signal from macro base station MBS as it would decode its own signal.

If the data of the interfering transmission from macro base station MBS is successfully received at the UE as indicated by successful CRC check at CRC decision block 919, interference cancellation decision block 910 may use the successfully decoded data bits from interference transport data block to reconstruct an estimate of the interfering MBS downlink transmission. More particularly, interference transport block generator 931, interference channel encoder 933, interference interleaver and modulator 935, and interference spreader and scrambler 937 may operate as discussed above with respect to transmitter elements/functionalities of FIG. 7. Interference construction block 939 may then provide the reconstruction of the interfering MBS downlink transmission, and Combiner 900 may subtract the reconstruction of the interfering MBS downlink transmission from the received signals before a second pass of reception using primary signal detector 901, primary signal de-interleaver 903, primary signal channel decoder 905, primary signal transport block generator 907, and primary signal CRC decision block 909. If the downlink data from low power node LPN is not successfully received at the UE in the first pass as indicated by a failed CRC check at CRC decision block 909, the UE may transmit a NAK requesting retransmission of the downlink data. If the downlink data from low power node LPN is successfully received at the UE in the second pass as indicated by a successful CRC check at CRC decision block 909, the UE may transmit an ACK requesting retransmission of the downlink data, and interference cancellation decision block may allow transport block generator 907 to pass the successfully received data to a higher layer of the UE downlink receiver/processor.

Interference cancellation decision block 910 thus decides whether interference cancellation should be considered (e.g., when the downlink data from LPN is not successfully decoded in the first pass), and if so, interference cancellation decision block 910 decides whether (or not) the interfering downlink transmission from macro base station MBS can be reconstructed based on output of interference CRC decision block 919. For example, the decision is based on 1. If the desired UE signal from LPN is NAK in the first pass and the interfering downlink transmission from the MBS (intended for another UE) is ACK, then a second pass of reception (using primary receiver elements/functionalities) may be conducted using interference cancellation; and/or
2. If the desired UE signal is NAK in the first pass and the interfering downlink transmission from the MBS (intended for another UE) is NAK, then a second pass of reception may be omitted and a NAK may be transmitted to the low power node LPN requesting retransmission; and/or
3. As an alternative, even if neither signal is successfully decoded at blocks 909 and 919, interference cancellation may be performed for a second pass of reception based on the SINR (signal to interference and noise ratio) of the output symbols (from de-interleaver 913) of the interfering downlink transmission from macro base station MBS. If decoding fails at block 919 but the SINR of the interfering signal exceeds a threshold, interference symbols from de-interleaver 913 may be interleaved and modulated at block 935 and spread and scrambled at block 937 so that interference reconstruction may be provided from block 939 to combiner 900 for a second pass of reception with interference cancellation. If decoding fails at block 919 and SINR of the interfering signal is less than the threshold, the UE may transmit a NAK to low power node LPN requesting retransmission.

Interference cancellation is discussed in U.S. Patent Publication No. 2012/0189083 to Andres Reial entitled "Interference Cancellation Based On Interfering Link IL Signal Quality And Related Methods And Devices."

Once the other (interfering) signal intended for wireless terminal 200b is reconstructed (using operations/functionalities discussed above with respect to FIG. 9), the resultant signal may be combined with (e.g., subtracted from) received signal using combiner 900, thereby reducing interference due to the interfering downlink transmission from macro base station MBS that is intended for the other UE 200b. The resultant interference reduced signal may then be decoded in a second pass as discussed above with respect to the first pass using primary signal detector 901, primary signal de-interleaver 903, primary signal channel decoder 905, primary signal transport block generator 907, and primary signal CRC decision block 909.

Figure 10:
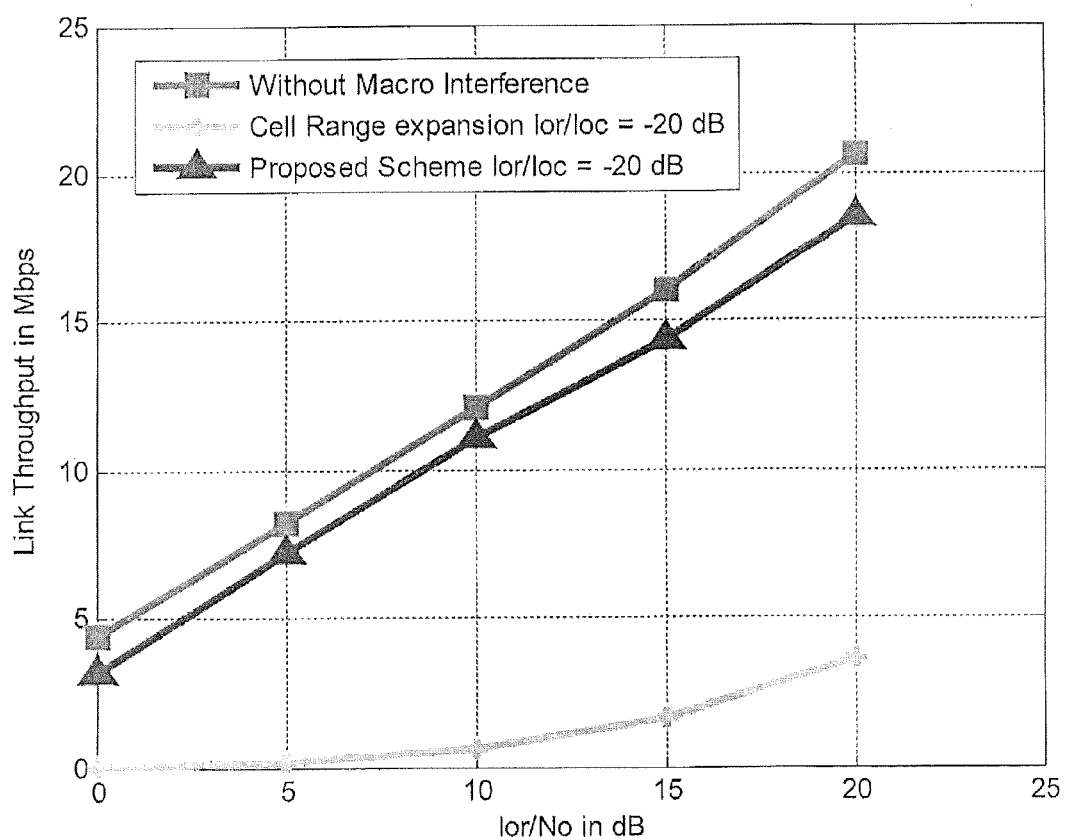
FIG. 10 is a graph illustrating simulated link throughput using interference cancellation according to some embodiments.

FIG. 10 is a graph illustrating simulated link throughputs using operations discussed above with respect to FIG. 9. In simulations used to generate the data of FIG. 10, the interfering downlink transmission from macro base station (intended for the other UE 200b) was reconstructed when the desired UE signal was a NAK (i.e., when the desired signal was not successfully decoded in a first reception pass). As shown, the performance (indicated by triangles) may be close to that provided in ideal conditions without macro base station interference (indicated with squares).

Figure 11A:
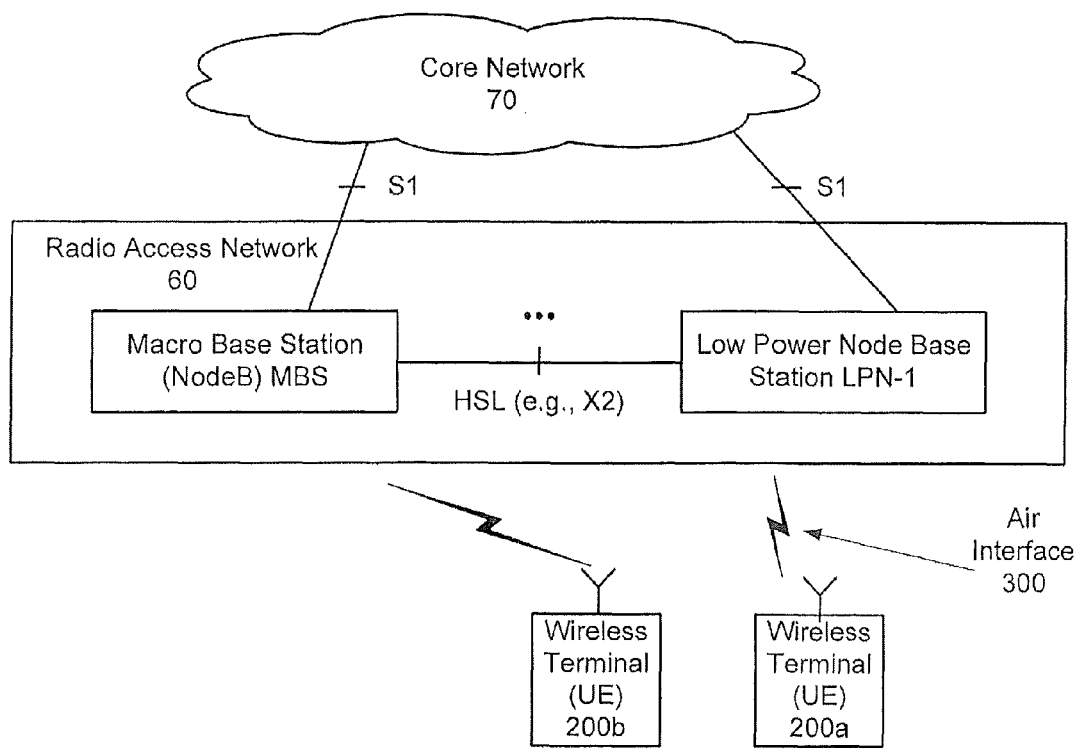
FIG. 11A is a block diagram illustrating elements/functionalities of a radio network configuration of FIG. 6.

FIG. 11A is a schematic diagram of the communication system of FIG. 6 that is configured to operate according to some embodiments of present inventive concepts. An example RAN 60 is shown that may be a Long Term Evolution (LTE) RAN. As shown, radio base stations (e.g., NodeBs) MBS and LPN-1 may be connected directly to one or more core networks 70 and/or intervening radio network controller (RNC) nodes may be provided between base stations and core network 70. In some embodiments, functionalities of a radio network controller (RNC) node may be performed by the radio base stations and/or core network. The base stations MBS and LPN-1 communicate over an air interface 300 (also referred to as a wireless channel or channels) with wireless terminals (also referred to as user equipment nodes or UEs) 200 that are within their respective communication service cells (also referred to as coverage areas). The radio base stations 100 can communicate with one another through a high speed link HSL (e.g., an X2 interface) and with the core network(s) 70 through S1 interfaces. High speed link HSL (e.g., and X2 interface) may provide relatively low latency backhaul connectivity between macro and LPN base stations MBS and LPN-1 to support communication of scheduling information between base stations for individual transmission time intervals, TTIs.

RAN 60 may be a heterogeneous network, and base station MBS may thus be a macro base stations that transmits/receives communications over a relatively large cell/geographic coverage area Mca, while low power node LPN base station LPN-1 may transmit/receive communications over a relatively small cell/geographic area Lca including a cell expansion region at a periphery thereof.

Figure 11B:
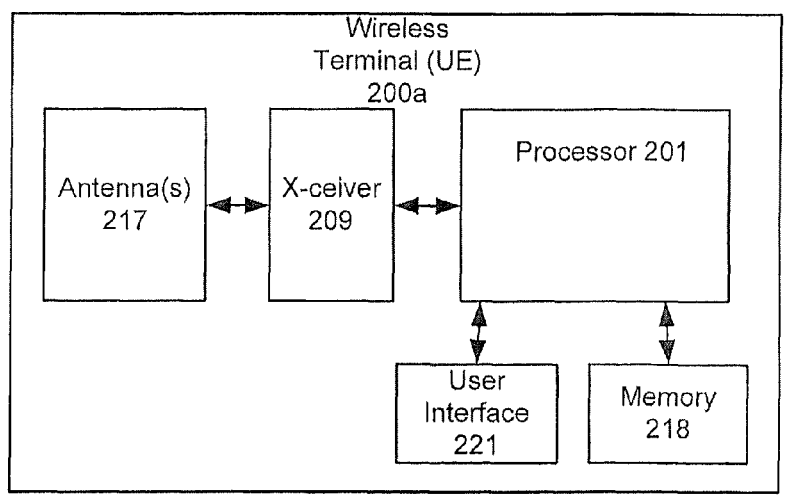
FIGS. 11B, 11C, and 11D are block diagrams respectively illustrating elements/functionalities of wireless terminals, macro base stations, and LPN base stations of FIGS. 6 and 11A.
Figure 11C:
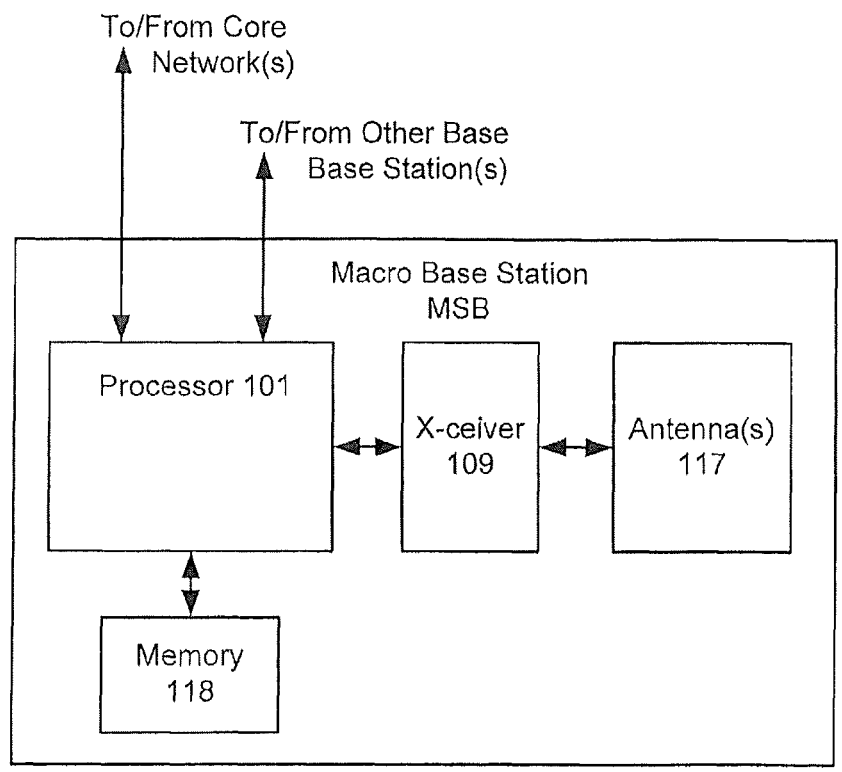

FIG. 11B is a block diagram illustrating elements/functionalities of a wireless terminal (either wireless terminal 200a or 200b) of FIG. 11A, and FIG. 11C is a block diagram illustrating elements/functionalities of a macro base station 100 of FIG. 11A. As shown, macro base station MBS may include transceiver 109 coupled between processor 101 and antenna(s) 117 (e.g., an antenna array including multiple antennas), and memory 118 coupled to processor 101. Moreover, wireless terminal 200a may include transceiver 209 coupled between antenna(s) 217 (e.g., an antenna array including multiple antennas supporting multiple-input-multiple-output MIMO communications) and processor 201, and user interface 221 (e.g., including one or more of a display, a touch sensitive screen, a keypad, a microphone, a speaker, etc.) and memory 218 may be coupled to processor 201. Elements of FIG. 11B are shown by way of example, and illustrated elements may be omitted and/or other elements may be included. Accordingly, macro base station MBS may transmit communications from processor 101 through transceiver 109 and antenna array 117 for reception at a wireless terminal 200 (e.g., wireless terminal 200b) through antenna(s) 217, transceiver 209, and processor 201, and a wireless terminal 200 (e.g., wireless terminal 200b) may transmit communications from processor 201 though transceiver 209 and antenna(s) 217 for reception at base station 100 through antenna(s) 117, transceiver 109, and processor 101. Functionality of FIGS. 8 and 9 may be implemented by wireless terminal transceiver 209 and/or processor 201 of FIG. 11B. Functionality of FIG. 7 may be implemented by base station processor 101 and/or transceiver 109 of FIG. 11C.

Figure 11D:
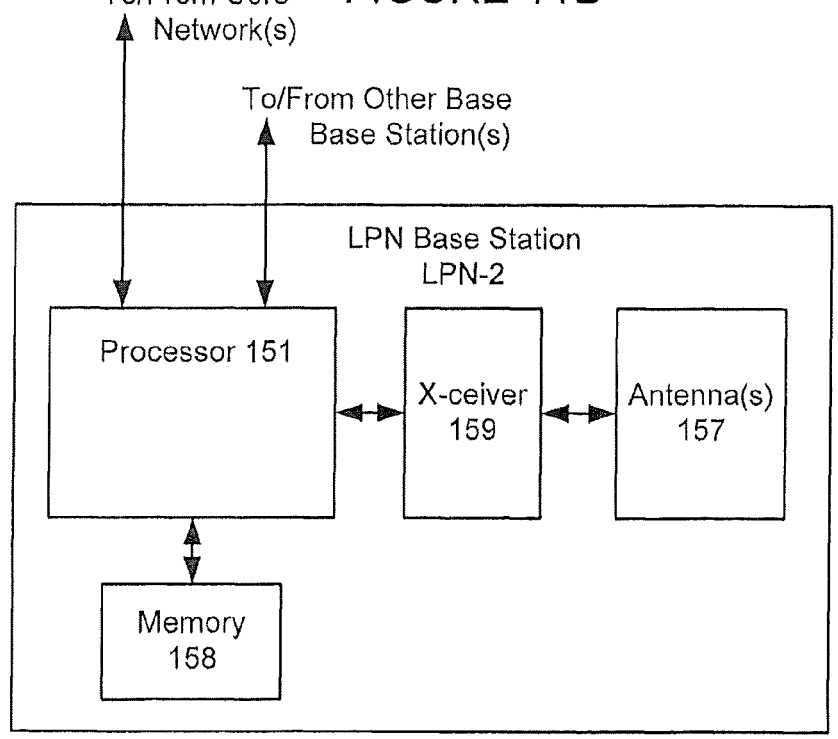

FIG. 11D is a block diagram illustrating elements/functionalities of low power node base station LPN-1 of FIG. 11A. As shown, LPN base station LPN-1 may include transceiver 159 coupled between processor 151 and antenna(s) 157 (e.g., an antenna array including multiple antennas supporting MIMO communications), and memory 158 coupled to processor 151. Accordingly, LPN base station LPN-1 may transmit communications from processor 151 through transceiver 159 and antenna array 157 for reception at a wireless terminal 200 (e.g., wireless terminal 200a) through antenna(s) 217, transceiver 209, and processor 201, and wireless terminal 200 (e.g., wireless terminal 200a) may transmit communications from processor 201 though transceiver 209 and antenna(s) 217 for reception at LPN base station LPN-1 through antenna(s) 157, transceiver 159, and processor 151. Functionality of FIG. 7 may be implemented by base station processor 151 and/or transceiver 159 of FIG. 11D.

With reference to FIGS. 11A and 11B, wireless terminal 200a may be a first node, LPN base station LPN-1 may be a second node, and wireless terminal 200b may be a third node. First node 200a may be configured to operate in wireless communication network 60. As shown, first node 200a may include transceiver 209 configured to transmit/receive communications to/from second node LPN-1 of wireless communication network 60, and processor 201 coupled to transceiver 209. Processor 201 may be configured to receive first information through transceiver 209 from second node LPN-1, and the first information may be for a first data transmission from second node LPN-1 to first node 200a. Processor 201 may also be configured to receive second information through transceiver 209 from second node LPN-1, and the second information may be for a second data transmission to a third node 200b communicating with the wireless communication network 60. In addition, processor 201 may be configured to receive the first data transmission through transceiver 209 from second node LPN-1 using the first information for the first data transmission received from second node LPN-1 and using the second information for the second data transmission received from second node LPN-1.

With reference to FIGS. 11A and 11C, macro base station MBS may be a first base station, and LPN base station LPN-1 may be a second base station. First base station MBS may operate in a wireless communication network 60, and first base station MBS may include a transceiver 109 configured to transmit/receive communications to/from wireless terminal 200b, and a processor 101 coupled to transceiver 109. Processor 101 may be configured to transmit scheduling information through transceiver 109 to wireless terminal 200b, and the scheduling information may be for a data transmission to wireless terminal 200b. Processor 101 may also be configured to transmit interfering link information to second base station LPN-1, and the interfering link information may be related to the data transmission to wireless terminal 200b. In addition, processor 101 may be configured to transmit the data transmission from first base station MBS to the wireless terminal 200b in accordance with the scheduling information for the data transmission.

With reference to FIGS. 11A and 11D, LPN base station LPN-1 may be a first node, wireless terminal 200a may be a second node, and wireless terminal 200b may be a third node. First node LPN-1 may be configured to operate in wireless communication network 60. As shown, first node LPN-1 may include transceiver 159 configured to transmit/receive communications to/from second node 200a, and processor 151 coupled to transceiver 159. Processor 151 may be configured to transmit first information through transceiver 159 to second node 200a wherein the first information is for a first data transmission from first node LPN-1 to second node 200a. Processor 151 may also be configured to transmit second information through transceiver 159 to second node 200a, and the second information may be for a second data transmission to third node 200b communicating with the wireless communication network 60. In addition, processor 151 may be configured to transmit the first data transmission through transceiver 209 to second node 200a in accordance with the first information for the first data transmission.

FIG. 12 is a flow chart illustrating operations of low power node LPN-1 processor 151 and/or transceiver 159 according to some embodiments. As discussed above with respect to FIGS. 6 and 11A, low power node LPN-1 may be in communication with wireless terminal 200a in a cell expansion region Lcer of LPN-1, and downlink data transmission from macro base station MBS to wireless terminal 200b may interfere with downlink data transmissions from low power node LPN-1 to wireless terminal 200a if both occur during a same transmission time interval because both are being transmitted using a same frequency.

At block 1221, processor/transceiver 151/159 may determine whether a transmission time interval should be scheduled for a downlink data transmission to wireless terminal 200a. If a transmission time interval should be scheduled for wireless terminal 200a at block 1221, processor/transceiver 151/159 may schedule the data transmission at block 1223 including selecting the TTI, transport block size, modulation order, code rate, and spreading code for the downlink transmission. If the downlink is a MIMO transmission, processor/transceiver 151/159 may also select a MIMO precoding vector and a MIMO rank for the scheduled data transmission.

Having selected the transmission time interval, processor/transceiver 151/159 may transmit a request to macro base station MBS over high speed link HSL requesting information regarding interfering link information for any potentially interfering downlink transmissions from macro base station MBS during the scheduled TTI. In an alternative, macro base station MBS may provide interfering link information to low power nodes without requiring a request so that the request of block 1225 may be omitted. Requiring the request of block 1225 may reduce overall system traffic in that the macro base station is only required to provide interfering link information for specific TTIs to specific low power nodes when such information is needed (as indicated by a request), but the sequential nature of the request and response may delay downlink scheduling/transmission from a low power node. While broadcast of interfering link information to all low power nodes for all macro base station MBS downlink transmission may reduce delays for downlink scheduling/transmission from low power nodes, such broadcasts may diminish other aspects of network performance.

If interfering link information is received from macro base station MBS for the scheduled TTI at block 1227, at block 1229, processor/transceiver 151/159 may transmit the interfering link information from low power node LPN-1 to wireless terminal 200a, with the interfering link information being for the downlink data transmission from macro base station MBS to wireless terminal 200b. According to some embodiments, the interfering link information may include scheduling information for the downlink data transmission to wireless terminal 200b, such as, spreading code information, modulation information, transport block size information, MIMO precoding vector information, and/or MIMO rank information. According to some other embodiment, the interfering link information may include an identification (e.g., a UE ID) of the third node. The interfering link information, for example, may be transmitted from low power node LPN-1 to wireless terminal 200a over a control channel, such as a high speed shared control channel (HS- SCCH). More particularly, the interfering link information may be transmitted as an HS-SCCH order over a high speed shared control channel.

At block 1231, processor/transceiver 151/159 may transmit scheduling information from low power node LPN-1 to wireless terminal 200a, with the scheduling information being for the scheduled data transmission from low power node LPN-1 to wireless terminal 200a. The scheduling information for the downlink data transmission to wireless terminal 200a may include at least one of spreading code information, modulation information, and/or transport block size information, and if the downlink transmission is a MIMO transmission, the scheduling information may also include MIMO precoding vector information and/or MIMO rank information.

At block 1233, processor/transceiver 151/159 may transmit the scheduled downlink data transmission from low power node LPN-1 to wireless terminal 200a in accordance with the scheduling information of block 1231. More particularly, the data transmission from low power node LPN-1 to wireless terminal 200a may be transmitted during the scheduled TTI, interfering downlink transmission from macro base station MBS to wireless terminal 200b may be transmitted during at least a portion of the TTI, and these downlink transmissions may use a same downlink frequency but different spreading codes. Interference at wireless terminal 200a, however, may be mitigated by using the interfering link information provided at block 1229. If the interfering link information includes the scheduling information for the interfering downlink, wireless terminal 200a may receive and reconstruct the interfering downlink communication from MBS to UE 200b to provide interference cancellation as discussed above, for example, with respect to FIG. 9. If the interfering link information included an identification of wireless terminal 200b, wireless terminal 200a can use the identification to receive scheduling information for the interfering downlink via control channel transmissions (e.g., HS-SCCH) from macro base station MBS, and wireless terminal 200a can then use the scheduling information to receive and reconstruct the interfering downlink communication from MBS to UE 200b to provide interference cancellation as discussed above, for example, with respect to FIG. 9.

If interfering link information is not received from macro base station MBS for the scheduled TTI at block 1227, processor/transceiver 151/159 may proceed with operations of blocks 1231 and 1233 without providing interfering link information. Macro base station MBS, for example, may inform low power node LPN-1 that there will be no interfering transmissions during the scheduled TTI, and this information may be transmitted to wireless terminal 200a to indicate that interference cancellation is not required for the scheduled TTI.

Operations of FIG. 12 for wireless terminal 200a may continue at block 1235 as long as wireless terminal 200a and low power node LPN-1 remain in communication.

FIG. 13 is a flow chart illustrating operations of macro base station MBS processor 101 and/or transceiver 109 according to some embodiments. As discussed above with respect to FIG. 12, a low power node may request interfering link information, and when such a request is received at block 1321, processor/transceiver 101/109 may determine if any interfering downlink transmission from macro base station MBS are scheduled during the indicated TTI at block 1323.

If an interfering downlink transmission from macro base station MBS is scheduled at block 1323, processor/transceiver 101/109 may transmit interfering link information to low power node LPN-1 that generated the request, with the interfering link information relating to the scheduled data transmission to the wireless terminal 200b. As discussed above, the interfering link information may include scheduling information for the interfering downlink transmission from macro base station MBS to wireless terminal 200b. More particular, the scheduling information may include at least one of spreading code information, modulation information, transport block size information for the data transmission, MIMO precoding vector information for the data transmission, and/or MIMO rank information for the data transmission. According to some other embodiments, the interfering link information may include an identification of the wireless terminal 200b (e.g., a UE ID) that is the intended recipient of the interfering link transmission.

Accordingly, MBS processor/transceiver 101/109 may schedule its downlink transmissions, and responsive to a request from low power node LPN-1 regarding a particular TTI at block 1321, MBS processor/transceiver 101/109 may respond with interfering link information for downlink transmissions from macro base station MBS during the particular TTI. According to some other embodiments, MBS processor/transceiver 101/109 may transmit interfering link information for all potentially interfering downlink transmissions to all low power nodes LPNs operating in a macro base station coverage area Mca so that requests from low power nodes are not required.

At block 1327, macro base station processor/transceiver 101/109 may transmit the scheduling information (e.g., spreading code information, modulation information, transport block size information, MIMO precoding vector information, and/or MIMO rank information) for the interfering downlink transmission with an identification (e.g., a UE ID) for wireless terminal 200b over a downlink control channel (e.g., a high-speed shared control channel or HS-SCCH for MBS). If the identification for wireless terminal 200b is provided to low power node LPN-1 as the interfering link information, wireless terminal 200a may use the identification of wireless terminal 200b to receive this scheduling information from the MBS control channel. At block 1329, macro base station processor/transceiver 101/109 may then transmit the downlink data transmission to the wireless terminal 200b (e.g., using a data channel such as HS-DPSCH) in accordance with the scheduling information of block 1327.

Low power node LPN-1 and macro base station MBS may thus transmit respective downlink transmissions to wireless terminals 200a and 200b during a same TTI or over overlapping TTIs on a same frequency using different spreading codes. Because wireless terminal 200a is provided with scheduling information for the interfering transmission from macro base station to wireless terminal 200b, wireless terminal 200a may receive the interfering transmission to wireless terminal 200b and perform interference cancellation to mitigate effects of interference from the macro base station transmission.

If macro base station MBS has not scheduled downlink data transmissions during the TTI indicated in the request from LPN-1 at block 1323, macro base station processor/transceiver 101/109 may respond to LPN-1 at block 1331 that there is no interfering link information for the indicated TTI.

Figure 14:
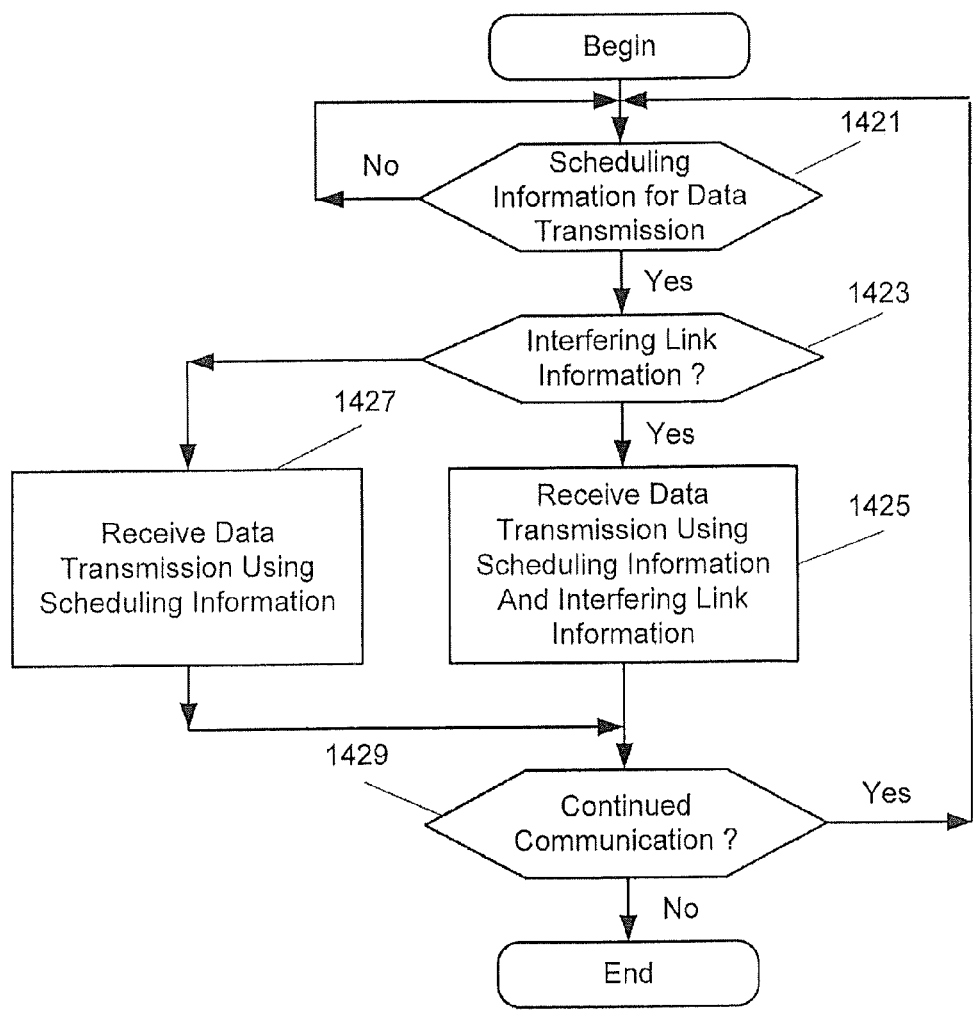
FIG. 14 is a flow chart illustrating operations of a wireless terminal UE of FIGS. 6, 11A, and 11B according to some embodiments.

FIG. 14 is a flow chart illustrating operations of wireless terminal 200a processor 201 and/or transceiver 209 according to some embodiments. As discussed above with respect to FIGS. 6, 9, 12 and 13, wireless terminal processor/ transceiver 201/209 may use scheduling information for an interfering downlink data transmission from macro base station MBS to receive the interfering downlink data transmission and perform interference cancellation.

At block 1421, wireless terminal 200a processor/transceiver 201/209 may receive scheduling information from low power node LPN-1 for a downlink data transmission from low power node LPN-1 to wireless terminal 200a during a scheduled TTI. The scheduling information for the downlink data transmission from LPN-1 may include at least one of spreading code information, modulation information, transport block size information, MIMO precoding vector information, and/or MIMO rank information.

Once the scheduling information is received at block 1421, wireless terminal processor/transceiver 201/209 may determine if interfering link information is also available/provided for the scheduled TTI at block 1423. For example, an interfering link information may be available for a downlink data transmission from macro base station MBS to wireless terminal 200b. If interfering link information is available/provided, wireless terminal processor/transceiver 201/209 may receive the interfering link information from low power node LPN-1 at block 1423. As discussed above, the interfering link information may include scheduling information for the interfering downlink transmission or an identification of wireless terminal 200b that is the intended recipient of the interfering downlink transmission. At block 1425, wireless terminal 200a processor/transceiver 201/209 may receive the scheduled downlink data transmission from low power node LPN-1 using the scheduling information for the downlink data transmission from low power node LPN-1 and using the interfering link information for the interfering downlink data transmission.

As discussed above, the interfering link information may be provided from macro base station MBS to low power node LPN-1, and the interfering link information may include scheduling information for the interfering downlink data transmission from macro base station MBS to wireless terminal 200a or an identification of wireless terminal 200b (which is the intended recipient of the interfering downlink data transmission). If the interfering link information includes scheduling information for the interfering downlink data transmission, the interfering link information may include at least one of spreading code information, modulation information, transport block size information, MIMO precoding vector information, and/or MIMO rank information. By providing the scheduling information for the interfering downlink data transmission directly from macro base station MBS to low power node LPN-1 to wireless terminal 200a, wireless terminal 200a can use the scheduling information to receive and reconstruct the interfering downlink data transmission for interference cancellation. If the interfering link information includes an identification of wireless terminal 200b, wireless terminal 200a can receive the scheduling information for the interfering downlink data transmission over a control channel (HS-SCCH) transmitted by macro base station MBS.

As discussed above, the downlink data transmission from LPN-1 to wireless terminal 200a and the interfering downlink data transmission from macro base station MBS to wireless terminal 200b may be transmitted using a same frequency over a same TTI or over overlapping TTIs, but using different spreading codes.

If the interfering link information provided by low power node LPN-1 includes the scheduling information for the interfering downlink transmission, receiving the downlink data transmission from low power node LPN-1 at block 1425 may include receiving the interfering downlink data transmission from macro base station MBS using the scheduling information for interfering downlink data transmission received from the low power node LPN-1 and a received radio signal for the scheduled TTI. A reconstruction of the interfering downlink data transmission may be generated responsive to receiving the interfering downlink data transmission, and the downlink data transmission from LPN-1 may be received using the received radio signal and the reconstruction of the interfering downlink data transmission. More particularly, the reconstruction of the interfering downlink data transmission may be used to provide interference cancellation/reduction as discussed above with respect to FIG. 9.

If the interfering link information provided by low power node LPN-1 includes an identification of wireless terminal 200b, receiving the first data transmission at block 1425 may include using the identification of wireless terminal 200b to receive the scheduling information for the interfering downlink data transmission, and receiving the interfering downlink data transmission using the scheduling information for the interfering downlink data transmission and a received radio signal. A reconstruction of the second data transmission may be generated responsive to receiving the second data transmission, and the downlink data transmission from LPN-1 may be received using the received radio signal and the reconstruction of the second data transmission. More particularly, the reconstruction of the interfering downlink data transmission may be used to provide interference cancellation/reduction as discussed above with respect to FIG. 9.

Receiving the interfering downlink data transmission may include generating symbols of the interfering downlink data transmission, and generating the reconstruction of the interfering downlink data transmission may include generating the reconstruction of the interfering downlink data transmission using symbols of the interfering downlink data transmission without demodulating the symbols. According to some other embodiments, receiving the interfering downlink data transmission may include generating symbols of the interfering downlink data transmission and generating data bits of the interfering downlink data transmission by demodulating the symbols. Moreover, generating the reconstruction of the interfering downlink data transmission may include generating the reconstruction of the interfering downlink data transmission using the data bits of the interfering downlink data transmission. According to still other embodiments, the interfering downlink data transmission may be reconstructed using data bits of the interfering downlink data transmission if the data bits pass error detection/correction (e.g., CRC error detection/correction), the interfering downlink data transmission may be reconstructed using symbols of the interfering downlink data transmission (without demodulation) if the data bits fail error detection/correction and a SINR (signal to interference and noise ratio) threshold for the interfering downlink data transmission is exceeded, and interference cancellation may be omitted if error detection/correction fails and the SINR threshold is not exceeded.

As noted above, the interfering link information may be received at wireless terminal 200a from LPN-1 over a control channel (e.g., HS-SCCH), for example, using an HS-SCCH order.

Figure 15:
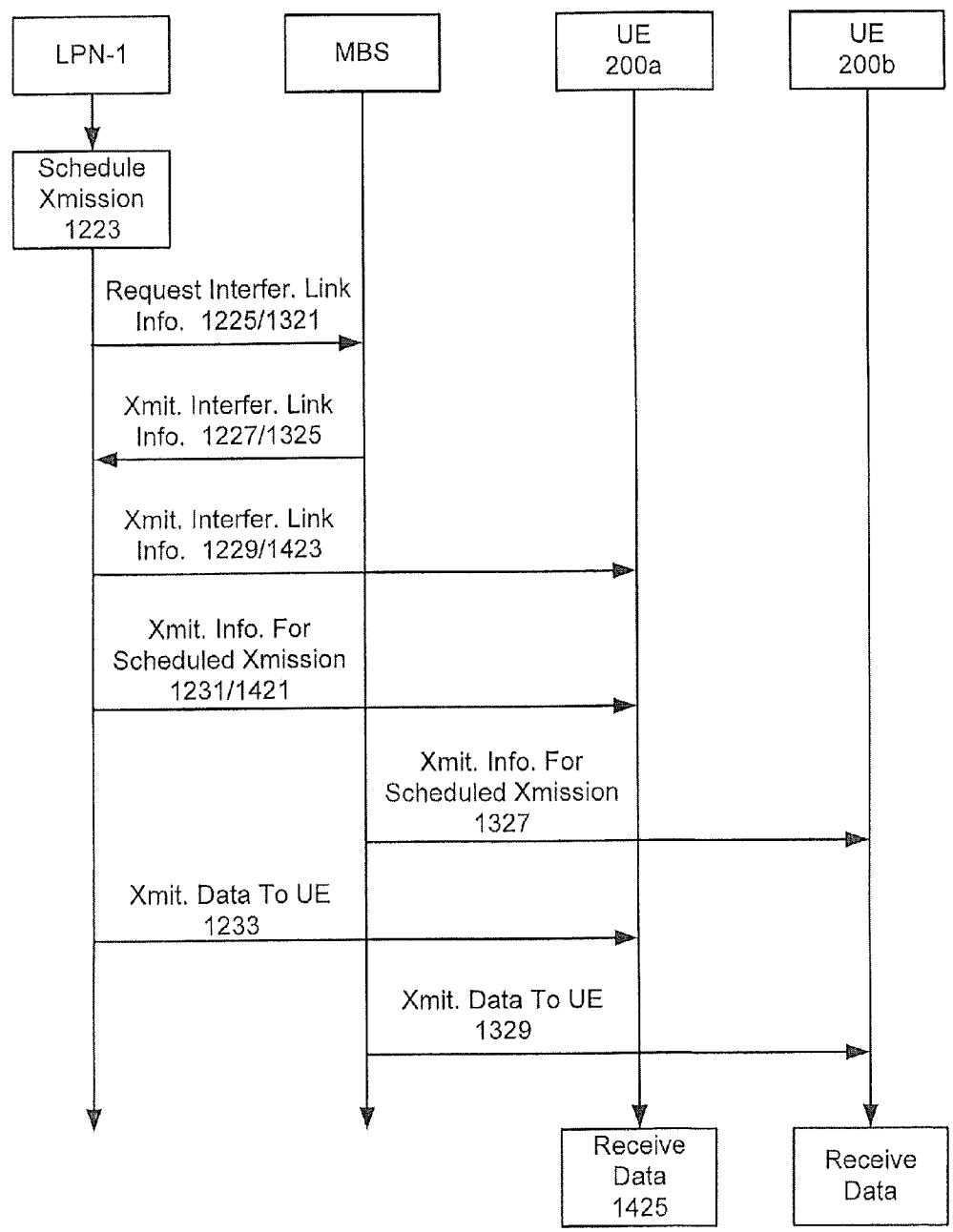
FIG. 15 is a signalling diagram illustrating operations of LPN base stations, macro base stations, and wireless terminals according to some embodiments.

FIG. 15 is a signaling diagram illustrating operations of low power node base station LPN-1, macro base station MBS, wireless terminal 200a, and wireless terminal 200b according to some embodiments discussed above with respect to the flow charts of FIGS. 12, 13, and 14. In FIG. 15, the reference numbers represent the same numbered operations of FIGS. 12, 13, and 14.

At block 1223, low power node LPN-1 schedules a data transmission for wireless terminal 200a, and low power node LPN-1 transmits a request to macro base station MBS requesting information for potentially interfering downlink transmissions from macro base station during the scheduled transmission time interval (TTI). This request may be transmitted/received as discussed above with respect to operations/blocks 1225/1321 of FIGS. 12 and 13. Macro base station MBS may respond with interfering link information as discussed above with respect to operations/blocks 1227/1325 of FIGS. 12 and 13.

Low power node LPN-1 may then transmit the interfering link information to wireless terminal 200a, and transmission/reception of this interfering link information is discussed above with respect to operations/blocks 1229/1423 of FIGS. 12 and 14. Low power node LPN-1 may also transmit information for the scheduled transmission to wireless terminal 200a, and transmission/reception of this information is discussed above with respect to operations/blocks 1231/1421 of FIGS. 12 and 14.

Macro base station MSB may transmit information for the interfering transmission to wireless terminal 200b, and transmission/reception of this information is discussed with respect to operation/block 1327 of FIG. 13. Low power node LPN-1 transmits the data to wireless terminal 200a as discussed above with respect to operation/block 1233 of FIG. 12, and macro base station transmits the other data to wireless terminal 200b as discussed above with respect to operation/block 1329 of FIG. 13. Wireless terminal 200a can then receive the data transmission using the scheduling information and the interfering link information as discussed above with respect to block 1425 of FIG. 14.

Figure 16:
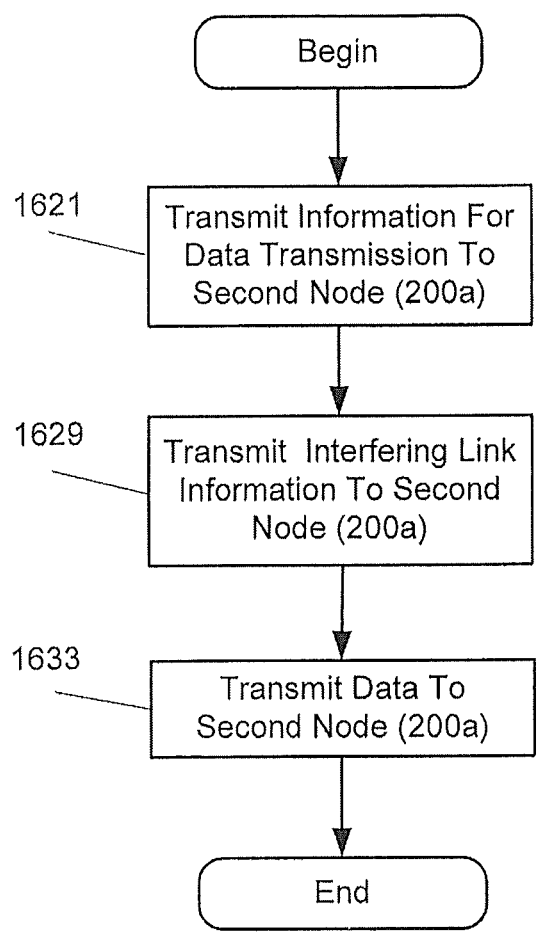
FIG. 16 is a flow chart illustrating operations of transmitting communication from a first node operating in wireless network to a second node according to some embodiments.

According to embodiments of FIGS. 16 and 11A, LPN base station LPN-1 may be a first node, wireless terminal (UE) 200a may be a second node, and wireless terminal (UE) 200b may be a third node. More particularly, FIG. 16 illustrates operations of a method of transmitting communication from first node LPN-1 operating in wireless network 60 to second node 200a. At block 1621, first information may be transmitted from first node LPN-1 to second node 200a operating in wireless network 60, and the first information may be for a first data transmission from first node LPN-1 to second node 200a. At block 1629, second information may be transmitted from first node LPN-1 to second node 200a, and the second information may be for a second data transmission to third node 200b operating in wireless communication network 60. At block 1633, the first data transmission may be transmitted from first node LPN-1 to second node 200a in accordance with the first information for the first data transmission.

Figure 17:
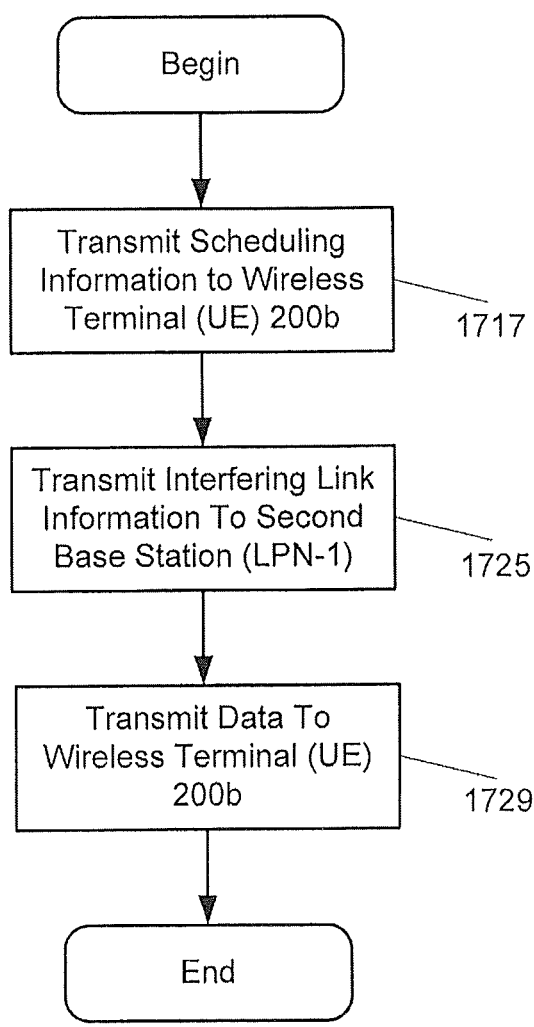
FIG. 17 is a flow chart illustrating operations of operating a first base station communicating with a wireless terminal in a wireless network according to some embodiments.

According to embodiments of FIGS. 17 and 11A, macro base station MBS may be a first base station and LPN base station LPN-1 may be a second base station. More particularly, FIG. 17 illustrates operations of a method of operating first base station MBS communicating with wireless terminal 200b in wireless network 60. At block 1717, scheduling information may be transmitted from first base station MBS to wireless terminal 200b, and the scheduling information may be for a data transmission to wireless terminal 200b. At block 1725, interfering link information may be transmitted from first base station MBS to second base station LPN-1, and the interfering link information may relate to the data transmission to wireless terminal 200b. At block 1729, the data transmission may be transmitted from first base station MBS to wireless terminal 200b in accordance with the scheduling information for the data transmission.

According to embodiments of FIGS. 18 and 11A, wireless terminal 200a may be a first node, LPN base station LPN-1 may be a second node, and wireless terminal 200b may be a third node. More particularly, FIG. 18 illustrates operations of a method of receiving communications at first node 200a from second node LPN-1 operating in wireless communication network 60. At block 1821, first information may be received from second node LPN-1 operating in wireless communication network 60, and the first information may be for a first data transmission from second node LPN-1 to first node 200a. At block 1823, second information may be received from second node LPN-1, and the second information may be for a second data transmission to third node 200b operating in wireless communication network 60. At block 1825, the first data transmission may be received at first node 200a from second node LPN-1 using the first information for the first data transmission received from second node LPN-1 and using the second information for the second data transmission received from second node LPN-1.

EXAMPLES OF EMBODIMENTS

Embodiment 1

A method of receiving communications at a first node (200a) operating in a wireless communication network from a second node (LPN-1), the method comprising: receiving (1421) first information from the second node (LPN-1) operating in the wireless communication network, wherein the first information is for a first data transmission from the second node (LPN-1) to the first node (200a); receiving (1423) second information from the second node, wherein the second information is for a second data transmission to a third node (200b) operating in the wireless communication network; and receiving (1425) the first data transmission at the first node (200a) from the second node (LPN-1) using the first information for the first data transmission received from the second node (LPN-1) and using the second information for the second data transmission received from the second node (LPN-1).

Embodiment 2

The method of embodiment 1 wherein the first node (200a) comprises a first wireless terminal, wherein the second node (LPN-1) comprises a base station, and wherein the third node comprises a second wireless terminal (200b).

Embodiment 3

The method of embodiment 2 wherein the second node (LPN-1) comprises a first base station, and wherein the second data transmission is from a second base (MBS) station to the second wireless terminal (200b).

Embodiment 4

The method of embodiment 3 wherein the first base station (LPN-1) comprises a low power node and wherein the second base station (MBS) comprises a macro base station.

Embodiment 5

The method of any one of embodiments 1-4 wherein the first data transmission from the second node (LPN-1) is transmitted during a transmission time interval, TTI, wherein the second data transmission to the third node (200b) is transmitted during at least a portion of the TTI, and wherein the first and second data transmissions are transmitted using a same frequency.

Embodiment 6

The method of embodiment 5 wherein the first and second data transmissions are transmitted using different spreading codes.

Embodiment 7

The method of any one of embodiments 1-6 wherein the first information includes scheduling information for the first data transmission from the second node (LPN-1) to the first node (200a).

Embodiment 8

The method of embodiment 7 wherein the scheduling information for the first data transmission includes at least one of spreading code information for the first data transmission, modulation information for the first data transmission, transport block size information for the first data transmission, MIMO precoding vector information for the first data transmission, and/or MIMO rank information for the first data transmission.

Embodiment 9

The method of any one of embodiments 1-8 wherein the second information includes scheduling information for the second data transmission to the third node (200b).

Embodiment 10

The method of any one of embodiments 9 wherein receiving the first data transmission comprises, receiving the second data transmission using the scheduling information for the second data transmission received from the second node (LPN-1) and a received radio signal, generating a reconstruction of the second data transmission responsive to receiving the second data transmission, and receiving the first data transmission using the received radio signal and the reconstruction of the second data transmission.

Embodiment 11

The method of any one of embodiments 1-8 wherein the second information includes an identification of the third node (200b).

Embodiment 12

The method of Embodiment 11 wherein receiving the first data transmission comprises, receiving scheduling information for the second data transmission to the third node (200b) using the identification of the third node, receiving the second data transmission using the scheduling information for the second data transmission and a received radio signal, generating a reconstruction of the second data transmission responsive to receiving the second data transmission, and receiving the first data transmission using the received radio signal and the reconstruction of the second data transmission.

Embodiment 13

The method of any one of embodiments 9, 10, or 12 wherein the scheduling information for the second data transmission includes at least one of spreading code information for the second data transmission, modulation information for the second data transmission, transport block size information for the second data transmission, MIMO precoding vector information for the second data transmission, and/or MIMO rank information for the second data transmission.

Embodiment 14

The method of any one of embodiments 10 or 12 wherein receiving the second data transmission comprises generating symbols of the second data transmission, and wherein generating the reconstruction of the second data transmission comprises generating the reconstruction of the second data transmission using symbols of the second data transmission.

Embodiment 15

The method of embodiment 14 wherein generating the reconstruction comprises generating the reconstruction of the second data transmission using symbols of the second data transmission without using bits from demodulating the symbols.

Embodiment 16

The method of any one of embodiments 10 or 12 wherein receiving the second data transmission comprises generating symbols of the second data transmission and generating data bits of the second data transmission by demodulating the symbols, and wherein generating the reconstruction of the second data transmission comprises generating the reconstruction of the second data transmission using the data bits of the second data transmission.

Embodiment 17

The method of any one of embodiments 1-16 wherein receiving second information from the second node comprises receiving the second information from the second node (LPN-1) over a control channel.

Embodiment 18

The method of embodiment 17 wherein receiving the second information from the second node (LPN-1) comprises receiving the second information over the control channel using a high speed shared control channel, HS-SCCH, order.

Embodiment 19

A method of transmitting communication from a first node (LPN-1) operating in a wireless network to a second node (200a), the method comprising: transmitting (1231) first information from the first node (LPN-1) to the second node (200a) operating in the wireless network, wherein the first information is for a first data transmission from the first node (LPN-1) to the second node (200a); transmitting (1229) second information from the first node (LPN-1) to the second node (200a), wherein the second information is for a second data transmission to a third node (200b)

operating in the wireless communication network; and transmitting (1233) the first data transmission from the first node (LPN-1) to the second node (200a) in accordance with the first information for the first data transmission.

Embodiment 20

The method of embodiment 19 wherein the first node comprises a base station (LPN-1), wherein the second node comprises a first wireless terminal (200a), and wherein the third node comprises a second wireless terminal (200b).

Embodiment 21

The method of embodiment 20 wherein the first node comprises a first base station (LPN-1), and wherein the second data transmission is from a second base station (MBS) to the second wireless terminal (200b).

Embodiment 22

The method of embodiment 21 wherein the first base station comprises a low power node (LPN-1) and wherein the second base station comprises a macro base station (MBS).

Embodiment 23

The method of any one of embodiments 21-22 further comprising: before transmitting the second information, receiving (1227) the second information from the second base station (MBS).

Embodiment 24

The method of any one of embodiments 19-23 wherein the first data transmission to the second node (200a) is transmitted during a transmission time interval, TTI, wherein the second data transmission to the third node (200b) is transmitted during at least a portion of the TTI, and wherein the first and second data transmissions are transmitted using a same frequency.

Embodiment 25

The method of embodiment 24 wherein the first and second data transmissions are transmitted using different spreading codes.

Embodiment 26

The method of any one of embodiments 19-25 wherein the first information includes scheduling information for the first data transmission from the first node (LPN-1) to the second node (200a).

Embodiment 27

The method of embodiment 26 wherein the scheduling information for the first data transmission includes at least one of spreading code information for the first data transmission, modulation information for the first data transmission, transport block size information for the first data transmission, MIMO precoding vector information for the first data transmission, and/or MIMO rank information for the first data transmission.

Embodiment 28

The method of any one of embodiments 26-27 wherein transmitting the first data transmission comprises transmitting the first data transmission in accordance with the scheduling information for the first data transmission.

Embodiment 29

The method of any one of embodiments 19-28 wherein the second information includes scheduling information for the second data transmission to the third node (200b).

Embodiment 30

The method of embodiment 29 wherein the scheduling information for the second data transmission includes at least one of spreading code information for the second data transmission, modulation information for the second data transmission, transport block size information for the second data transmission, MIMO precoding vector information for the second data transmission, and/or MIMO rank information for the second data transmission.

Embodiment 31

The method of any one of embodiments 19-28 wherein the second information includes an identification of the third node (200b).

Embodiment 32

The method of any one of embodiments 19-31 wherein transmitting the second information comprises transmitting the second information over a control channel.

Embodiment 33

The method of embodiment 32 wherein transmitting the second information comprises transmitting the second information over the control channel using a high speed shared control channel, HS-SCCH, order.

Embodiment 34

A method of operating a first base station (MBS) communicating with a wireless terminal (200b) in a wireless network, the method comprising: transmitting (1327) scheduling information from the first base station (MBS) to the wireless terminal (200b), wherein the scheduling information is for a data transmission to the wireless terminal (200b); transmitting (1325) interfering link information from the first base station (MBS) to a second base station (LPN-1), wherein the interfering link information relates to the data transmission to the wireless terminal (200b); and transmitting (1329) the data transmission from the first base station (MBS) to the wireless terminal (200b) in accordance with the scheduling information for the data transmission.

Embodiment 35

The method of embodiment 34 wherein the first base station (MBS) comprises a macro base station and wherein the second base station (LPN-1) comprises a low power node base station.

Embodiment 36

The method of any one of embodiments 34-35 wherein the data transmission is transmitted during a transmission time interval, TTI, wherein a second data transmission is transmitted by the second base station (LPN-1) to a second wireless terminal (200a) during at least a portion of the TTI, and wherein the first and second data transmissions are transmitted using a same frequency.

Embodiment 37

The method of embodiment 36 wherein the first and second data transmissions are transmitted using different spreading codes.

Embodiment 38

The method of any one of embodiments 34-37 wherein the scheduling information for the data transmission includes at least one of spreading code information for the data transmission, modulation information for the data transmission, transport block size information for the data transmission, MIMO precoding vector information for the data transmission, and/or MIMO rank information for the data transmission.

Embodiment 39

The method of any one of embodiments 34-38 wherein the interfering link information includes the scheduling information for the data transmission.

Embodiment 40

The method of any one of embodiments 34-38 wherein the interfering link information includes an identification of the wireless terminal (200b).

Embodiments disclosed herein may improve link performance/throughput for the UEs communicating with low power nodes LPNs in cell range expansion regions. Since performance degradation due to macro base station interference may be reduced, UEs may be more aggressively offloaded from macro base stations to low power nodes, and gains due to load balancing may be increased. Stated in other words, cell expansion regions may be further expanded and/or performance of UEs in cell expansion regions may be improved. Moreover, embodiments of interference cancellation disclosed herein may be used to reduce/remove interference received at a UE from any base station source (e.g., interference from a second LPN when a UE is communicating with a first LPN; interference from a LPN when a UE is communicating with a MBS; etc.)

ABBREVIATIONS

MIMO Multiple input multiple output
HSDPA High Speed Downlink Packet Access
HSPA High Speed Packet Access
HS-SCCH High speed shared control channel
HS-PDSCH High speed Physical data shared channel
HARQ Hybrid automatic repeat request
UE User Equipment
TTI Transmit Time Interval
PCI Precoding control index
Tx Transmitter
LPN Low Power Node
L1 Layer 1
RRU Remote Radio Unit
RNC Radio Network Controller
DL Downlink
WCDMA Wideband Code Division Multiple Access
3GPP 3rd Generation Partnership Project
CPICH Common Pilot Channel
GSM Global System for Mobile (Communication)
LTE Long Term Evolution In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following claims and their equivalents, and shall not be restricted or limited by the foregoing detailed description.

That which is claimed is:

1. A method of receiving communications at a first node from a second node operating in a wireless communication network, the method comprising:
    receiving first information from the second node operating in the wireless communication network, wherein the first information is for a first data transmission from the second node to the first node;
    receiving second information from the second node using a high speed shared control channel, HS-SCCH, order, wherein the second information is for a second data transmission to a third node operating in the wireless communication network; and
    receiving the first data transmission at the first node from the second node using the first information for the first data transmission received from the second node and using the second information for the second data transmission received from the second node.

2. The method of claim 1 wherein the first node comprises a first wireless terminal, wherein the second node comprises a first base station, wherein the third node comprises a second wireless terminal, and wherein the second data transmission is from a second base station to the second wireless terminal.

3. The method of claim 1 wherein the first data transmission from the second node is transmitted during a transmission time interval, TTI, wherein the second data transmission to the third node is transmitted during at least a portion of the TTI, and wherein the first and second data transmissions are transmitted using a same frequency.

4. The method of claim 3 wherein the first and second data transmissions are transmitted using different spreading codes.

5. The method of claim 1 wherein the first information includes scheduling information for the first data transmission from the second node to the first node, and/or wherein the second information includes scheduling information for the second data transmission to the third node.

6. The method of claim 5 wherein the scheduling information for the first data transmission includes at least one of spreading code information for the first data transmission, modulation information for the first data transmission, transport block size information for the first data transmission, Multiple Input Multiple Output, MIMO, precoding vector information for the first data transmission, and/or MIMO rank information for the first data transmission, and/or wherein the scheduling information for the second data transmission includes at least one of spreading code information for the second data transmission, modulation information for the second data transmission, transport block size information for the second data transmission, MIMO precoding vector information for the second data transmission, and/or MIMO rank information for the second data transmission.

7. The method of claim 5 wherein receiving the first data transmission comprises,
    receiving the second data transmission using the scheduling information for the second data transmission received from the second node and a received radio signal, generating a reconstruction of the second data transmission responsive to receiving the second data transmission, and receiving the first data transmission using the received radio signal and the reconstruction of the second data transmission.

8. The method of claim 1 wherein the second information includes an identification of the third node.

9. The method of claim 8 wherein receiving the first data transmission comprises, receiving scheduling information for the second data transmission to the third node using the identification of the third node, receiving the second data transmission using the scheduling information for the second data transmission and a received radio signal, generating a reconstruction of the second data transmission responsive to receiving the second data transmission, and receiving the first data transmission using the received radio signal and the reconstruction of the second data transmission.

10. The method of claim 9 wherein receiving the second data transmission comprises generating symbols of the second data transmission and generating data bits of the second data transmission by demodulating the symbols, and wherein generating the reconstruction of the second data transmission comprises generating the reconstruction of the second data transmission using the data bits of the second data transmission.

11. The method of claim 9 wherein receiving the second data transmission comprises generating symbols of the second data transmission, and wherein generating the reconstruction of the second data transmission comprises generating the reconstruction of the second data transmission using symbols of the second data transmission.

12. The method of claim 11 wherein generating the reconstruction comprises generating the reconstruction of the second data transmission using symbols of the second data transmission without using bits from demodulating the symbols.

13. A method of transmitting communication from a first node operating in a wireless network to a second node, the method comprising:

transmitting first information from the first node to the second node operating in the wireless network, wherein the first information is for a first data transmission from the first node to the second node;

transmitting second information from the first node to the second node using a high speed shared control channel, HS-SCCH, order, wherein the second information is for a second data transmission to a third node operating in the wireless communication network; and transmitting the first data transmission from the first node to the second node in accordance with the first information for the first data transmission.

14. The method of claim 13 wherein the first node comprises a first base station, wherein the second node comprises a first wireless terminal, wherein the third node comprises a second wireless terminal, and wherein the second data transmission is from a second base station to the second wireless terminal.

15. The method of claim 14 further comprising:

before transmitting the second information, receiving the second information from the second base station.

16. The method of claim 13 wherein the first data transmission to the second node is transmitted during a transmission time interval, TTI, wherein the second data transmission to the third node is transmitted during at least a portion of the TTI, and wherein the first and second data transmissions are transmitted using a same frequency.

17. The method of claim 16 wherein the first and second data transmissions are transmitted using different spreading codes.

18. The method of claim 13 wherein the first information includes scheduling information for the first data transmission from the first node to the second node, and/or wherein the second information includes scheduling information for the second information includes scheduling information for the second data transmission to the third node.

19. The method of claim 18 wherein the scheduling information for the first data transmission includes at least one of spreading code information for the first data transmission, modulation information for the first data transmission, transport block size information for the first data transmission, Multiple Input Multiple Output, MIMO, precoding vector information for the first data transmission, and/or MIMO rank information for the first data transmission, and/or wherein the scheduling information for the second data transmission includes at least one of spreading code information for the second data transmission, modulation information for the second data transmission, transport block size information for the second data transmission, MIMO precoding vector information for the second data transmission, and/or MIMO rank information for the second data transmission.

20. The method of claim 18 wherein transmitting the first data transmission comprises transmitting the first data transmission in accordance with the scheduling information for the first data transmission.

21. The method of claim 13 wherein the second information includes an identification of the third node.

22. A first wireless terminal configured to operate in a wireless communication network, the first wireless terminal comprising:

a transceiver configured to transmit/receive communications to/from a first base station of the wireless communication network; and a processor coupled to the transceiver, wherein the processor is configured to, receive first information through the transceiver from the first base station wherein the first information is for a first data transmission from the first base station to the first wireless terminal, receive second information through the transceiver from the first base station wherein the second information is for a second data transmission to a second wireless terminal communicating with the wireless communication network, wherein the second information is received at the transceiver using a high speed shared control channel, HS-SCCH, order, and receive the first data transmission through the transceiver from the first base station using the first information for the first data transmission received from the first base station and using the second information for the second data transmission received from the first base station;

wherein the second data transmission is from a second base station to the second wireless terminal.

23. A first base station operating in a wireless communication network, the first base station comprising:

a transceiver configured to transmit/receive communications to/from a first wireless terminal; and a processor coupled to the transceiver, wherein the processor is configured to,
 transmit first information through the transceiver to the first wireless terminal wherein the first information is for a first data transmission from the first base station to the first wireless terminal,
 transmit second information through the transceiver to the first wireless terminal using a high speed shared control channel, HS-SCCH, order, wherein the second information is for a second data transmission to a second wireless terminal communicating with the wireless communication network, and
 transmit the first data transmission through the transceiver to the first wireless terminal in accordance with the first information for the first data transmission;
 wherein the second data transmission is from a second base station to the second wireless terminal.

24. A first node configured to operate in a wireless communication network, the first node being configured to:
 receive first information from a second node wherein the first information is for a first data transmission from the second node to the first node,
 receive second information through the transceiver from the second node wherein the second information is for a second data transmission to a third node communicating with the wireless communication network, wherein the second information is received using a high speed shared control channel, HS-SCCH, order, and
 receive the first data transmission from the second node using the first information for the first data transmission received from the second node and using the second information for the second data transmission received from the second node.

25. A first node operating in a wireless communication network, the first node being configured to:
 transmit first information to a second node wherein the first information is for a first data transmission from the first node to the second node,
 transmit second information to the second node using a high speed shared control channel, HS-SCCH, order, wherein the second information is for a second data transmission to a third node communicating with the wireless communication network, and
 transmit the first data transmission to the second node in accordance with the first information for the first data transmission.

\* \* \* \* \*